United States Patent
Goto et al.

(10) Patent No.: US 11,098,167 B2
(45) Date of Patent: Aug. 24, 2021

(54) POLYMER PARTICLES AND USE THEREOF

(71) Applicant: SEKISUI PLASTICS CO., LTD., Osaka (JP)

(72) Inventors: Takashi Goto, Shiga (JP); Tomoyuki Takahashi, Shiga (JP); Satoru Matsumoto, Shiga (JP)

(73) Assignee: SEKISUI PLASTICS CO., LTD., Osaka (JP)

( * ) Notice: Subject to any disclaimer, the term of this patent is extended or adjusted under 35 U.S.C. 154(b) by 232 days.

(21) Appl. No.: 15/764,058

(22) PCT Filed: Mar. 25, 2016

(86) PCT No.: PCT/JP2016/059720
§ 371 (c)(1),
(2) Date: Mar. 28, 2018

(87) PCT Pub. No.: WO2017/056529
PCT Pub. Date: Apr. 6, 2017

(65) Prior Publication Data
US 2018/0273696 A1 Sep. 27, 2018

(30) Foreign Application Priority Data

Sep. 30, 2015 (JP) .............................. JP2015-194341

(51) Int. Cl.
| | |
|---|---|
| *C08J 3/03* | (2006.01) |
| *B32B 27/20* | (2006.01) |
| *C08F 20/10* | (2006.01) |
| *C08F 2/18* | (2006.01) |
| *C08F 6/04* | (2006.01) |
| *C08J 3/02* | (2006.01) |
| *C09D 201/00* | (2006.01) |
| *C08F 12/00* | (2006.01) |
| *G02B 5/02* | (2006.01) |
| *C08L 101/00* | (2006.01) |
| *C09D 7/40* | (2018.01) |
| *C09D 7/65* | (2018.01) |
| *C08F 12/08* | (2006.01) |
| *C08L 25/14* | (2006.01) |

(52) U.S. Cl.
CPC ................ *C08J 3/03* (2013.01); *B32B 27/20* (2013.01); *C08F 2/18* (2013.01); *C08F 6/04* (2013.01); *C08F 12/00* (2013.01); *C08F 12/08* (2013.01); *C08F 20/10* (2013.01); *C08J 3/02* (2013.01); *C08L 25/14* (2013.01); *C08L 101/00* (2013.01); *C09D 7/40* (2018.01); *C09D 7/65* (2018.01); *C09D 7/69* (2018.01); *C09D 201/00* (2013.01); *G02B 5/02* (2013.01); *G02B 5/0226* (2013.01); *C08J 2325/14* (2013.01); *C08J 2433/10* (2013.01)

(58) Field of Classification Search
CPC .......... C09D 7/40; C09D 7/65; C09D 201/00; C09D 7/69; C08F 6/04; C08F 12/08; C08F 12/00; C08F 20/10; C08F 2/18; C08L 101/00; C08L 25/14; G02B 5/02; G02B 5/0226; C08J 3/02; C08J 3/03; C08J 2325/14; C08J 2433/10; B32B 27/20

See application file for complete search history.

(56) References Cited

U.S. PATENT DOCUMENTS

| | | | | |
|---|---|---|---|---|
| 2010/0266948 | A1* | 10/2010 | Lai ........................ | B01F 3/2078 430/137.14 |
| 2012/0238705 | A1 | 9/2012 | Sekiya | |
| 2015/0005437 | A1 | 1/2015 | Teramoto | |
| 2015/0010860 | A1* | 1/2015 | Kataoka ............. | G03G 9/08795 430/105 |

FOREIGN PATENT DOCUMENTS

| | | |
|---|---|---|
| JP | 2010-248275 | 11/2010 |
| JP | 2013-203938 | 10/2013 |
| JP | 2014-198785 | 10/2014 |
| JP | 2014-198797 | 10/2014 |
| JP | 2015-4007 | 1/2015 |
| JP | 5740479 | 6/2015 |
| KR | 10-2012-0116393 | 10/2012 |

(Continued)

OTHER PUBLICATIONS

Extended European Search Report dated Apr. 2, 2019 in corresponding European Application No. 16850707.7.
Notification of Reason for Refusal dated Jul. 19, 2019 in Korean Patent Application No. 10-2018-7011934, with English Translation.
International Search Report dated Jun. 7, 2016 in International (PCT) Application No. PCT/JP2016/059720.

*Primary Examiner* — Angela C Scott

(74) *Attorney, Agent, or Firm* — Wenderoth, Lind & Ponack, L.L.P.

(57) ABSTRACT

Polymer particles excellent in uniform dispersibility and the use thereof are provided. The polymer particles contain a surfactant, and have a coefficient of variation in the volume-based particle diameter distribution in the range from not less than 13.0% to not more than 25.0%. When 15.0 g of water is added to 5.0 g of the polymer particles so as to disperse the polymer particles in the water by performing a dispersion treatment for 60 minutes using an ultrasonic cleaner, and furthermore when an obtained dispersion liquid is put into a centrifuge tube with an inside diameter of 24 mm so as to be centrifuged, by a centrifugal separator, under conditions that K factor is 6943 and a rotating time is 30 minutes to recover a supernatant, a concentration of non-volatile components in the obtained supernatant is less than 3.5 wt. %.

17 Claims, No Drawings

(56) References Cited

FOREIGN PATENT DOCUMENTS

| WO | 2011/062173 | 5/2011 |
| WO | 2013/030977 | 3/2013 |
| WO | 2015/029483 | 3/2015 |
| WO | 2015/045448 | 4/2015 |

* cited by examiner

POLYMER PARTICLES AND USE THEREOF

TECHNICAL FIELD

The present invention relates to polymer particles particularly suitable for a light diffusing agent for optical members such as a light diffusion film and an anti-glare film, and also relates to use of the polymer particles (i.e. a resin composition, an optical film and an external preparation).

BACKGROUND ART

Polymer particles having the volume average particle diameter in the range of 1 to 100 μm are used, for example, for an additive (e.g., a matting agent) to a coating agent such as coating material, an additive (e.g., a matting agent) to ink, a main component of or an additive to an adhesive, an additive (e.g., a shrinkage reducing agent) to artificially producted marble, a paper treating agent, a filler (filler for improving lubricity) to an external preparation such as cosmetics, a column packing material for chromatography, a toner additive for developing an electrostatic image, a surface roughening agent for a resin film, and a light diffusing agent for an optical member (e.g. optical films such as a light diffusion film and an anti-glare film, and a light diffuser).

For example, Patent Document 1 describes vinyl polymer fine particles that have a configuration in which: a volume average particle diameter is in the range from not less than 1.0 μm to not more than 3.5 μm; a coefficient of variation of the volume-based particle diameters is not less than 30%; and the number of coarse particles having a particle diameter 2 times or more the volume average particle diameter is not more than 180 in 1,000,000 (one million) fine particles (see claim 1).

Also, Patent Document 2 describes acrylic resin particles that satisfy the following expressions (1), (2), (3) and (4):

$$\alpha > \gamma > \eta \quad (1),$$

where $\alpha$ is a value obtained by dividing a cumulative 10% particle diameter on a volume basis by a cumulative 10% particle diameter on a number basis, $\gamma$ is a value obtained by dividing a cumulative 50% particle diameter on a volume basis by a cumulative 50% particle diameter on a number basis, and $\eta$ is a value obtained by dividing a cumulative 90% particle diameter on a volume basis by a cumulative 90% particle diameter on a number basis;

$$30\% \leq CV \text{ value of volume-based particle diameters} \leq 40\% \quad (2),$$

$$A \leq 0.75 \quad (3),$$

where A is obtained by dividing the cumulative 10% particle diameter on a volume basis by the cumulative 50% particle diameter on a volume basis, and $$1.1 \leq B \leq 1.6 \quad (4),$$

where B is obtained by dividing the cumulative 90% particle diameter on a volume basis by the cumulative 50% particle diameter on a volume basis. Furthermore, the cumulative 50% particle diameter of the acrylic resin particles on a volume basis is in the range of 1 to 50 μm (see claim 1 and paragraph [0025]).

PRIOR ART DOCUMENTS

Patent Documents

[Patent Document 1] JP 2014-198797 A
[Patent Document 2] JP 5740479

SUMMARY OF THE INVENTION

Problem to be Solved by the Invention

There are optical films such as a light diffusion film and an anti-glare film that are made by applying a coating liquid, which includes polymer particles dispersed in a binder or a solvent, on a film base material. In order to obtain an optical film that has uniform optical properties (such as light diffusibility, anti-glare property and light transmittance) and that can prevent generation of a transmission defect (i.e. defect in which one can visibly confirm a part through which the light transmits without being diffused) and the like, it is necessary to homogeneously disperse the polymer particles, without aggregation, in a resin composition (specifically, in the binder or the organic solvent) before applying the resin composition on the film base material.

However, in the acrylic resin particles disclosed in Patent Document 1, the CV value (coefficient of variation) of the volume-based particle diameter is in the range of 34.9 to 37.4% (see Examples 1 to 3), while in the vinyl polymer fine particles disclosed in Patent Document 2, the coefficient of variation of the volume-based particle diameter is not less than 30% (see claim 1). Thus, in both polymer particles disclosed by Patent Documents 1 and 2, the CV value of the volume-based particle diameter is not less than 30%, which means that a large proportion of small particles (i.e. polymer particles having a remarkably smaller particle diameter than the average particle diameter) and a large proportion of large particles (i.e. polymer particles having a remarkably larger particle diameter than the average particle diameter) are contained. In the above conventional polymer particles that contain a large proportion of small particles, the dispersion made by dispersing the polymer particles in another material has a low fluidity, and dispersibility of the polymer particles to another material is not uniform. For example, when manufacturing an optical film such as a light diffusion film or an anti-glare film by applying, on a film base material, a coating liquid including polymer particles dispersed in a binder or a solvent, it is difficult to evenly apply the coating liquid due to its increased viscosity (in other words, a high technic is required to apply it). Thus, the optical properties (such as light diffusibility, anti-glare property and light transmittance) of the obtained optical film are likely to be uneven, which may lead to a transmission defect (i.e. existence of a part through which the light transmits without being diffused) and the like. Also, in the above conventional polymer particles that contain a large proportion of large particles, aggregation easily occurs, which leads to an uneven dispersibility. For example, when manufacturing an optical film such as a light diffusion film or an anti-glare film by: applying, on a film base material, a coating liquid including polymer particles dispersed in a binder or a solvent; and drying the coated film base material, aggregation easily occurs in the drying process after application of the coating liquid because the largely contained large particles easily become start points for aggregation involving the small particles around them, which may result in generation of a defect. Thus, the optical properties (such as light diffusibility, anti-glare property and light transmittance) of the obtained optical film are likely to be uneven, which may lead to a transmission defect and the like.

The present invention was made in consideration of the above circumstances, and an object of which is to provide polymer particles excellent in uniform dispersibility, and also to provide resin compositions, optical films and external preparations using the above polymer particles.

Means for Solving the Problem

Polymer particles of the present invention contain a surfactant, and have a coefficient of variation in a volume-based particle diameter distribution in the range from not less than 13.0% to not more than 25.0%. When 15.0 g of water is added to 5.0 g of the polymer particles so as to disperse the polymer particles in the water by performing a dispersion treatment for 60 minutes using an ultrasonic cleaner, and furthermore when the obtained dispersion liquid is put into a centrifuge tube with an inside diameter of 24 mm so as to be centrifuged, by a centrifugal separator, under conditions that K factor is 6943 and a rotating time is 30 minutes to recover a supernatant, a concentration of non-volatile components in the obtained supernatant is less than 3.5 wt. %.

Generally, the polymer particles containing a surfactant can be obtained by suspension polymerization, seed polymerization and the like in the presence of a surfactant and aqueous medium. In thus obtained polymer particles, there usually are fine particles on the surfaces of the polymer particles or between the polymer particles, which are fine particles of the polymer particles (so-called "emulsion polymerization products) that are generated by emulsion polymerization in the aqueous phase (i.e. side reaction) and that have a considerably small particle diameter (for example, the particle diameter of not more than 500 nm) compared to the particle diameter of the target polymer particles. When the polymer particles contain a large proportion of fine particles such as emulsion polymerization products, the dispersion made by dispersing the polymer particles in another material has a low fluidity. As a result, the dispersibility of the polymer particles to another material may not be uniform. For example, when manufacturing an optical film such as a light diffusion film or an anti-glare film by applying, on a film base material, a coating liquid including the above polymer particles dispersed in a binder or a solvent, the viscosity of the coating liquid increases, which may lead to difficulty in even and uniform application and in overall stability of optical properties (such as light diffusibility, anti-glare property and light transmittance) of the obtained optical film. Thus, the optical properties of the obtained optical film are likely to be uneven, which may lead to a transmission defect and the like.

The concentration of the above non-volatile components corresponds to the content of the fine particles such as the emulsion polymerization products. In the polymer particles of the present invention, since the concentration of the non-volatile components is less than 3.5 wt. %, the amount of the fine particles such as the emulsion polymerization products, which exist on the surfaces of the polymer particles or between the polymer particles, is small. In the polymer particles of the present invention, in addition to the small content of the fine particles such as the emulsion polymerization products, the proportion of the small particles is also small since the coefficient of variation in the volume-based particle diameter distribution is not more than 25%. Thus, the fluidity of the dispersion made by dispersing the polymer particles to another material is high, which means that the polymer particles are excellent in uniform dispersibility in another material. For example, when manufacturing an optical film such as a light diffusion film or an anti-glare film by applying, on a film base material, the coating liquid including the polymer particles of the present invention dispersed in a binder or a solvent, it is possible to perform even and uniform application of a coating liquid by maintaining a low viscosity of the coating liquid. Thus, it is possible to obtain the optical film having uniform optical properties (e.g. light diffusibility, anti-glare property and light transmittance), which can reduce generation of defects such as a transmission defect.

Also, in the polymer particles of the present invention, since the coefficient of variation in the volume-based particle diameter distribution is not more than 25%, the proportion of the large particles, which easily become start points for aggregation involving small particles around them and cause a defect, is small. Thus, the aggregation is not likely to occur and the polymer particles are excellent in uniform dispersibility. For example, when manufacturing an optical film such as a light diffusion film or an anti-glare film by: applying, on a film base material, the coating liquid including the polymer particles of the present invention dispersed in a binder or a solvent; and drying the coated film base material, the aggregation at the time of applying and drying can be reduced, which can prevent generation of defects such as a transmission defect.

Also, in the polymer particles of the present invention, since the coefficient of variation in the volume-based particle diameter distribution is not less than 13%. Thus, when manufacturing an optical film such as a light diffusion film or an anti-glare film by applying, on a film base material, the coating liquid including the polymer particles of the present invention dispersed in a binder or a solvent, it is possible to prevent generation of a transmission defect thanks to a sufficient amount of small particles with which clearance among the polymer particles having approximately the average particle diameter are filled.

Also, when the polymer particles of the present invention are used as a light diffusing agent for an optical member, it is possible to realize the optical member excellent in light diffusibility thanks to the coefficient of variation in the volume-based particle diameter distribution of not less than 15.0%. Also, it is possible to realize the optical member excellent in optical transparency thanks to the coefficient of variation in the volume-based particle diameter distribution of not more than 25.0%.

The resin composition of the present invention includes the polymer particles of the present invention. The resin composition of the present invention is excellent in uniform dispersibility, because it includes the polymer particles of present invention having a uniform dispersibility.

An optical film of the present invention includes a base film and a coating formed on the base film, and the coating includes the polymer particles of the present invention.

Since the optical film of the present invention includes the coating that includes the polymer particles of the present invention having a uniform dispersibility, it is possible to obtain uniform optical properties (e.g. light diffusibility, anti-glare property, and light transmittance) over the entire optical film.

An external preparation of the present invention includes the polymer particles of the present invention. Since the external preparation of the present invention includes the polymer particles of the present invention having a uniform dispersibility, it is also excellent in uniform dispersibility, and exerts a rolling effect (i.e. lubricity, or ball bearing effect).

Effects of the Invention

With the present invention, it is possible to provide polymer particles excellent in uniform dispersibility, and to provide resin compositions, optical films and external preparations using the above polymer particles.

DESCRIPTION OF THE PREFERRED EMBODIMENTS

Hereinafter, the present invention will be described in detail.

[Polymer Particles]

The polymer particles of the present invention contain a surfactant, and have a coefficient of variation in a volume-based particle diameter distribution in the range from not less than 13.0% to not more than 25.0%. The polymer particles are dispersed in water by adding 15.0 g of water to 5.0 g of the polymer particles and by subjecting the mixture to a dispersion treatment for 60 minutes using an ultrasonic cleaner. The obtained dispersion liquid is put into a centrifuge tube with the inside diameter of 24 mm, and is centrifuged, by a centrifugal separator, under conditions that K factor is 6943 and the rotating time is 30 minutes. After that, a supernatant is recovered, and at this time, a concentration of non-volatile components (hereinafter referred to as "non-volatile component concentration") in the obtained supernatant is less than 3.5 wt. %. It is preferable that the coefficient of variation in the volume-based particle diameter distribution is in the range from more than 15.0% to not more than 5.0%.

More preferably, the above non-volatile component concentration is less than 2.0 wt. %, and in particular, less than 1.0 wt. %. In this way, it is possible to further improve the uniform dispersibility of the polymer particles.

It is preferable that the volume average particle diameter of the polymer particles as a light diffusing agent for an optical member is in the range of 0.5 to 100 μm, and in particular, in the range of 1 to 30 μm. In this way, when the polymer particles are used as the light diffusing agent to the optical members such as an anti-glare film and a light diffusion film, it is possible to realize an optical member that combines optical properties such as good anti-glare property and light diffusibility, and optical transparency. Note that in these application documents, the volume average particle diameter of the polymer particles means an arithmetic mean in the volume-based particle diameter distribution, which is measured by the Coulter method, in particular, by a method described in Examples.

The polymer particles having the volume average particle diameter in the range of 1 to 30 μm are suitable for a light diffusing agent for optical members such as optical films (e.g. an anti-glare film and a light diffusion film) and light diffusers. The above polymer particles are especially suitable for a light diffusing agent for a light diffusion film (in particular, a light diffusion film for a liquid crystal display), and for a light diffusing agent for a liquid crystal display. The polymer particles having the volume average particle diameter in the range of 1 to 30 μm can be classified into: the polymer particles having the volume average particle diameter in the range from not less than 1 μm to not more than 8 μm; and the polymer particles having the volume average particle diameter in the range from more than 8 μm to not more than 30 μm. The polymer particles having the volume average particle diameter in the range from not less than 1 μm to not more than 8 μm is suitable for a light diffusing agent for a small liquid crystal display (in particular, a light diffusing agent used as a light diffusion film that is used in a small liquid crystal display), because the small liquid crystal display is generally required to be a higher definition display (i.e. having narrowed pixel pitch) than the large liquid crystal display. The polymer particles having the volume average particle diameter in the range from more than 8 μm to not more than 30 μm is suitable for a light diffusing agent for a large liquid crystal display (in particular, a light diffusing agent used as a light diffusion film that is used in a large liquid crystal display), because the large liquid crystal display is also required to be a high definition display, but its request level is not so strict compared to the small liquid crystal display. The small liquid crystal display means a liquid crystal display of portable equipment such as a smartphone and a tablet terminal, and generally has a size of not more than 15 inches, typically not more than 10 inches. While the large liquid crystal display means a liquid crystal display of stationary equipment such as a liquid crystal television, and has a size of more than 15 inches, typically not less than 20 inches.

The volume average particle diameter of the polymer particles as an additive to a coating agent such as a coating material or an additive to ink is preferably in the range of 0.5 to 100 μm, more preferably in the range of 1 to 50 μm, especially preferably in the range of 4 to 40 μm, and most preferably in the range of 8 to 30 μm. In this way, it is possible to realize a coating or ink excellent in matting property and designability when using the polymer particles as an additive to a coating agent such as a coating material or an additive to ink.

The volume average particle diameter of the polymer particles as an additive to an external preparation is preferably in the range of 0.5 to 100 μm, more preferably in the range of 1 to 50 μm, especially preferably in the range of 4 to 30 μm, and most preferably in the range of 6 to 10 μm. In this way, it is possible to realize an external preparation that combines lubricity and light diffusibility when using the polymer particles as a filler to an external preparation.

The surfactant content per unit surface area of the polymer particles is preferably 10 to $250 \times 10^{-5}$ g/m$^2$, and more preferably 10 to $200 \times 10^{-5}$ g/m$^2$. When the polymer particles having the volume average particle diameter in the range from more than 8 μm to not more than 30 μm, the surfactant content per unit surface area of the polymer particles is further preferably 10 to $150 \times 10^{-5}$ g/m$^2$, and most preferably 10 to $100 \times 10^{-5}$ g/m$^2$. By setting the surfactant content per unit surface area of the polymer particles to not more than the upper limit of the above-described range, it is possible to further improve uniform dispersibility of the polymer particles. Also, it is difficult to manufacture the polymer particles in which the surfactant content per unit surface area of the polymer particles is less than the lower limit of the above-described range.

The amount of the surfactant contained in the polymer particles can be calculated, for example, by dividing the amount of surfactant contained in the polymer particles that is measured using a liquid chromatograph mass spectrometry (LC-MS-MS) by a specific surface area of the polymer particles that is measured using the BET method (nitrogen adsorption method).

The surfactant contained in the polymer particles of the present invention is a residual of the surfactant that was used for manufacturing the polymer particles. Accordingly, examples of the surfactants may contain all kinds of surfactants generally used for manufacturing the polymer particles, that is, an anionic surfactant, a nonionic surfactant, a cationic surfactant and a zwitterionic surfactant, which will appear in the section [Method for Manufacturing Polymer Particles] described later. Furthermore, it is preferable that the surfactant contained in the polymer particles of the present invention includes at least one of the anionic surfactant and the nonionic surfactant, and more preferably, includes the anionic surfactant. When the polymer particles of the present invention includes the anionic surfactant, it is possible to ensure dispersion stability during polymerization reaction.

The polymer that constitutes the polymer particles of the present invention is, for example, the polymer of a vinyl monomer. Examples of the vinyl monomer contain a monofunctional vinyl monomer having one ethylenically unsaturated group and a polyfunctional vinyl monomer having two or more ethylenically unsaturated groups.

Examples of the monofunctional vinyl monomer include: saturated fatty acid vinyl monomers such as (meth)acrylic acid ester monomer, styrene monomer (aromatic vinyl monomer), vinyl acetate, vinyl propionate, and vinyl versatate; vinyl cyanide monomers such as acrylonitrile, and methacrylonitrile; ethylenically unsaturated carboxylic acids such as acrylic acid, methacrylic acid, crotonic acid, citraconic acid, itaconic acid, maleic acid, and fumaric acid; ethylenically unsaturated carboxylic acid anhydrides such as maleic acid anhydride; ethylenically unsaturated dicarboxylic acid monoalkyl esters such as monobutyl maleic acid; ethylenically unsaturated carboxylic acid salts such as ammonium salt or alkali metal salt of the above ethylenically unsaturated carboxylic acid or ethylenically unsaturated dicarboxylic acid monoalkyl ester; ethylenically unsaturated carboxylic acid amides such as acrylamide, methacylamide, and diacetone acrylamide; and methylol compounds and their derivatives of ethylenically unsaturated carboxylic acid amides such as N-methylol acrylamide, N-methylol methacrylamide, and methylolated diacetone acrylamide, and ether compound of these monomers and alcohols having a carbon number of 1 to 8 (e.g. N-isobutoxy methyl acryl amide).

Examples of the above (meth)acrylic acid ester monomers include: acrylic acid alkyl monomers such as methyl acrylate, ethyl acrylate, n-butyl acrylate, isobutyl acrylate, 2-ethylhexyl acrylate, n-octyl acrylate, isononyl acrylate, lauryl acrylate, and stearyl acrylate; methacrylic acid alkyl monomers such as methyl methacrylate, ethyl methacrylate, n-butyl methacrylate, 2-ethylhexyl methacrylate, and stearyl methacrylate; (meth)acrylic acid esters having an epoxy group (glycidyl group) such as glycidyl acrylate, and glycidyl methacrylate; hydroxyl alkyl (meth)acrylates such as 2-hydroxyethyl methacrylate, and 2-hydroxypropyl acrylate; and hydroxyl alkyl (meth)acrylates such as 2-hydroxyethyl methacrylate, and 2-hydroxypropyl acrylate; and (meth)acrylic acid esters having an amino group such as dimethyl amino ethyl methacrylate, and diethyl amino ethyl methacrylate. The above (meth)acrylic acid ester monomer preferably contains at least one of the acrylic acid alkyl monomer and the methacrylic acid alkyl monomer. Note that in these application documents, the term "(meth)acrylate" means acrylate or methacylate while the term "(meth) acrylic" means acrylic or methacrylic.

Examples of the above styrene monomers include styrene, α-methyl styrene, vinyl toluene, and ethyl vinyl benzene.

Examples of the above polyfunctional vinyl monomers include allyl (meth)acrylate, divinyl benzene, diallyl phthalate, triallyl cyanurate, ethylene glycol di(meth)acrylate, diethylene glycol di(meth)acrylate, polyethylene glycol di(meth)acrylate (e.g. polyethylene glycol (600) dimethacrylate), propylene glycol di(meth)acrylate, triethylene glycol di(meth)acrylate, trimethylol propane tri(meth)acrylate, and pentaerythritol tetra(meth)acrylate.

Out of the above vinyl monomers, a single kind of vinyl monomer may be used, or two or more kinds of vinyl monomers may also be used in combination.

The above polymer particles are preferably constituted by at least one of the (meth)acrylic polymer, the styrene polymer and the (meth)acrylic-styrene co-polymer. In this way, it is possible to prepare polymer particles excellent in optical transparency. The above (meth)acrylic polymer is a polymer of the (meth)acrylic acid ester monomer, or a co-polymer of: the (meth)acrylic acid ester monomer; and the vinyl monomer other than the (meth)acrylic acid ester monomer and the styrene monomer. The above styrene polymer is a polymer of the styrene monomer, or a co-polymer of: the styrene monomer; and the vinyl monomer other than the (meth) acrylic acid ester monomer and the styrene monomer. Also, the above (meth)acrylic-styrene co-polymer is a co-polymer of the (meth)acrylic acid ester monomer and the styrene monomer, or a co-polymer of: the (meth)acrylic acid ester monomer; the styrene monomer; and the vinyl monomer other than the (meth)acrylic acid ester monomer and the styrene monomer. In these compositions, the above polymer particles are preferably constituted by the (meth)acrylic polymer, or by the (meth)acrylic-styrene co-polymer in respect of light diffusibility and antiglare property.

The polymer constituting the above polymer particles is preferably a co-polymer (cross-linked polymer) of the monofunctional vinyl monomer and the polyfunctional vinyl monomer. That is, the polymer constituting the above polymer particles is most preferably a (meth)acrylic cross-linked polymer or a (meth)acrylic-styrene cross-linked co-polymer in respect of light diffusibility and anti-glare property. For example, the amount of constitutional unit derived from the polyfunctional vinyl monomer in the above polymer is preferably in the range of 5 to 50 wt. % based on 100 wt. % of the polymer. If the amount of the constitutional unit derived from the polyfunctional vinyl monomer is less than the above range, the cross-linking degree of the polymer is reduced. As a result, when applying the polymer particles mixed with the binder as a resin composition, the polymer particles may swell and the viscosity of the resin composition may increase, which may lead to degradation of application workability. Furthermore, in the result of reduction of the cross-linking degree of the polymer, when using the polymer particles by mixing them with the binder and molding the mixture (so-called "kneading"), the polymer particles are likely to dissolve or deform by heat applied at the time of mixing or molding. If the amount of the constitutional unit derived from the polyfunctional vinyl monomer is more than the above range, the used amount of the polyfunctional vinyl monomer may fail to match the expected improvement in effectiveness, which may results in increase in production cost.

The gel fraction of the polymer particles of the present invention is preferably not less than 90 wt. %, and more preferably, not less than 97 wt. %. If the gel fraction is less than 90 wt. %, it is not possible to ensure sufficient solvent resistance. In this case, for example, when the polymer particles is mixed, together with the binder, with an organic solvent so that the mixture is applied onto a film base material to prepare an optical film such as an anti-glare film or a light diffusion film, the polymer particles dissolve in the organic solvent, which may prevent optical properties such as light diffusibility and anti-glare property from being sufficiently obtained. Note that in these application documents, the gel fraction means, for example, a gel fraction measured by a method described in Examples.

The refractive index of the polymer particles of the present invention is preferably in the range of 1.490 to 1.595. In this way, it is possible to realize an optical member excellent in optical properties (e.g. optical transparency, anti-glare property and light diffusibility) when the polymer particles having the above-described configuration are used in the optical member such as an anti-glare film or a light diffusion film.

In the polymer particles of the present invention, the maximum particle diameter in the volume-based particle diameter distribution is preferably not more than 3.5 times the volume average particle diameter. Also, when the polymer particles of the present invention have the volume average particle diameter in the range from not less than 1 µm to not more than 8 µm, the maximum particle diameter in the volume-based particle diameter distribution is preferably not more than 3.5 times the volume average particle diameter, and more preferably, not more than 2.5 times the volume average particle diameter. Also, when the polymer particles of the present invention have the volume average particle diameter in the range from more than 8 µm to not more than 30 µm, the maximum particle diameter in the volume-based particle diameter distribution is preferably not more than 2.5 times the volume average particle diameter, and more preferably, not more than 2.0 times the volume average particle diameter. By setting the maximum particle diameter in the volume-based particle diameter distribution to not more than the above upper limit, it is possible to remove coarse particles (polymer particles having a particle diameter larger than the above upper limit) that easily become start points for aggregation involving small particles around them and that cause a defect. Thus, it is possible to further improve uniform dispersibility of the polymer particles.

In the polymer particles of the present invention, when the volume average particle diameter is not less than 2 µm and not more than 4 µm, the number of the polymer particles having a particle diameter in the range from not less than 8 µm to not more than 10 µm is preferably not more than 2 in 300,000 (three hundred thousand) polymer particles. In this way, it is possible to remove the coarse particles (polymer particles having a particle diameter in the range from not less than 8 µm to not more than 10 µm) until only two or less of them remain. The coarse particles easily become start points for aggregation involving small particles around them and may cause a defect. Thus, it is possible to further improve uniform dispersibility of the polymer particles.

In the polymer particles of the present invention, the value obtained by dividing the coefficient of variation in the number-based particle diameter distribution by the coefficient of variation in the volume-based particle diameter distribution is preferably in the range of 1.0 to 3.0. The value obtained by dividing the coefficient of variation in the number-based particle diameter distribution by the coefficient of variation in the volume-based particle diameter distribution indicates variations in the distribution and numerousness of the small particles. By setting the value obtained by dividing the coefficient of variation in the number-based particle diameter distribution by the coefficient of variation in the volume-based particle diameter distribution to not more than the upper limit of the above-described range, it is possible to perform even and uniform application of a coating liquid by maintaining a low viscosity of the coating liquid when manufacturing an optical film such as a light diffusion film or an anti-glare film by applying, on a film base material, the coating liquid including polymer particles of the present invention dispersed in a binder or a solvent. Thus, it is possible to obtain the optical film having uniform optical properties (e.g. light diffusibility, anti-glare property and light transmittance), which can reduce generation of a defect such as a transmission defect. Also, by setting the value obtained by dividing the coefficient of variation in the number-based particle diameter distribution by the coefficient of variation in the volume-based particle diameter distribution to not less than the lower limit of the above-described range, it is possible to prevent generation of the transmission defect thanks to a sufficient amount of small particles with which clearance among the polymer particles having approximately the average particle diameter are filled when manufacturing an optical film such as a light diffusion film or an anti-glare film by applying, on a film base material, the coating liquid including polymer particles of the present invention dispersed in a binder or a solvent.

The polymer particles of the present invention are preferably transparent particles not containing dyes or pigments (organic pigments and inorganic pigments). The dyes or pigments contained in the polymer particles reduce transparency of the polymer particles, which adversely affects the transmission property, anti-glare property and diffusivility of the optical film prepared using the polymer particles of the present invention.

Method for Manufacturing Polymer Particles

The polymer particles of the present invention can be prepared, for example, by the following manufacturing method: obtaining polymer particles having the coefficient of variation of more than 25.0% in the volume-based particle diameter distribution by polymerizing a vinyl monomer in the presence of a surfactant in an aqueous medium; and then, classifying the polymer particles so that the coefficient of variation in the volume-based particle diameter distribution is in the range from not less than 13.0% to not more than 25.0%. According to the above manufacturing method, the content of fine particles that are generated by emulsion polymerization and the like and that exist on the surfaces of the polymer particles is reduced at the time of classification, thus, it is possible to obtain the polymer particles of the present invention in which the concentration of the non-volatile components is less than 3.5 wt. %.

In the above manufacturing method, a suspension liquid is prepared by dispersing the vinyl monomer in the aqueous medium by, for example, the following methods: a method in which the vinyl monomer and the surfactant are added to the aqueous medium and are dispersed using a homogenizer, an emulsifying disperser (for example, "HOMOGENIZING MIXER MARK II MODEL 2.5", manufactured by Primix Corporation) that uses a high shear due to gaps between rotary blades and a machine wall or gaps among rotary blades, a sonicator, and a fine emulsifier such as NANO-MIZER (registered trade mark); and a method in which the vinyl monomer is pressurized and passes through ceramic micro porous membrane so as to be introduced into the aqueous medium. According to purposes, another apparatus may be used.

Examples of the aqueous medium include: water; lower alcohols (alcohol having a carbon number of 5 or less) such as methyl alcohol and ethyl alcohol; and a mixture of water and a lower alcohol.

The surfactant serves to stabilize dispersion of the vinyl monomer in the liquid medium at the time of polymerization.

As the surfactant, any of the following may be used: an anionic surfactant; a cationic surfactant; a nonionic surfactant; and a zwitterionic surfactant. However, it is preferable to use at least one of the anionic surfactant and the nonionic surfactant because with such surfactants, it is possible to ensure the stability of dispersion of the vinyl monomer in the liquid medium in the polymerization process and to obtain polymer particles having approximately the same particle diameter. Also, it is more preferable to use, as the surfactant, at least an anionic surfactant. In this way, it is possible to ensure the dispersion stability in polymerization reaction. On the other hand, when only a nonionic surfactant is used as the surfactant, remarkable aggregation may occur at the time of polymerization reaction.

As the above anionic surfactant, it is possible to use any of the publicly known anionic surfactants such as a fatty acid salt type, a sulfuric acid ester salt type, a sulfonic acid salt type, a phosphoric acid ester salt type, and a phosphoric acid ester type. Examples of the above include: polyoxyethylene alkyl phenyl ether sulfuric acid ester salts; polyoxyethylene alkyl ether sulfuric acid salts such as polyoxyethylene lauryl ether sodium sulfurate; polyoxyethylene alkyl sulfuric acid esters; polyoxyethylene styrenated phenyl ether sulfuric acid ester salts such as polyoxyethylene styrenated phenyl ether sulfuric acid ester ammonium; polyoxyethylene alkyl phenyl ether phosphoric acid salts such as polyoxyethylene nonyl phenyl ether phosphoric acid salt (e.g. polyoxyethylene nonyl phenyl ether sodium phosphate); polyoxyethylene styrenated phenyl ether phosphoric acid esters; polyoxyethylene alkyl ether phosphoric acid esters; fatty acid soaps such as sodium oleate, and castor oil potash soap; alkyl sulfuric acid ester salts such as lauryl sulfuric acid salt (e.g. sodium lauryl sulfate and ammonium lauryl sulfate); alkyl benzene sulfonic acid salts such as sodium dodecylbenzene sulfonate; dialkyl sulfosuccinic acid salts such as alkyl naphthalene sulfonic acid salt, alkane sulfonic acid salt, di(2-ethylhexyl) sulfosuccinic acid salt (sodium salt), and dioctyl sulfosuccinic acid salt (sodium salt); alkenyl succinic acid salts (dipotassium salts); alkyl phosphoric acid ester salts; and naphtalene sulfonic acid formalin condensates. A single kind of the above anionic surfactant may be used, or two or more kinds of the above anionic surfactants may also be used in combination.

As the above nonionic surfactant, it is possible to use any of the publicly known nonionic surfactants such as an ester type, an ether type, and an ester-ether type. Examples of the nonionic surfactant include: polyoxyethylene alkyl ethers such as polyoxyethylene tridecyl ether; polyoxyethylene alkyl phenyl ethers such as polyoxyethylene octyl phenyl ether; polyoxyethylene styrenated phenyl ethers; polyoxyethylene fatty acid esters; polyoxyethylene sorbitan fatty acid esters such as polyoxyethylene sorbitan monolaurate; polyoxyethylene alkyl amines; oxyethylene-oxypropylene block polymers; polyoxyalkylene alkyl ethers such as polyoxyalkylene tridecyl ether whose alkylene group has a carbon number of 3 or more; sorbitan fatty acid esters; and glycerin fatty acid esters. A single kind of the above nonionic surfactant may be used, or two or more kinds of the above nonionic surfactants may also be used in combination.

As the above cationic surfactant, it is possible to use any of the publicly known cationic surfactants such as an amine salt type and a quaternary ammonium salt type. However, it is benefit to use a water soluble cationic surfactant in respect of handling. Examples of the above cationic surfactant include: alkyl amine salts such as lauryl amine acetate, and stearyl amine acetate; alkyl trimethyl ammonium chlorides such as lauryl trimethyl ammonium chloride, hexadecyl trimethyl ammonium chloride, cocoyl trimethyl ammonium chloride, and dodecyl trimethyl ammonium chloride; and alkyl dimethyl benzyl chlorides such as hexadecyl dimethyl benzyl ammonium chloride, and lauryl dimethyl benzyl ammonium chloride. A single kind of the above cationic surfactant may be used, or two or more kinds of the above cationic surfactants may also be used in combination.

Examples of the above zwitterionic surfactant include: lauryl dimethyl amine oxide; a phosphoric acid ester surfactant; and a phosphorous acid ester surfactant. A single kind of the above zwitterionic surfactant may be used, or two or more kinds of the above zwitterionic surfactants may also be used in combination.

A single kind of the above surfactant may be used, or two or more kinds of the above surfactants may also be used in combination. It is preferable that the solubility of the surfactant in water at 25° C. is in the range from 0.3 g/100 ml to 5.0 g/100 ml, and in particular, in the range from 0.5 g/100 ml to 3.0 g/100 ml. If using the surfactant having the solubility of less than 0.3 g/100 ml, and if the liquid medium is an aqueous medium in the polymerization process, the vinyl monomer may not be stably dispersed in the aqueous medium, and furthermore the surfactant is not likely to dissolve in the water. Accordingly, a large amount of cleaning solution is required in a cleaning process (described later) for cleaning the polymer particles, which is not preferable in respect of productivity. On the other hand, in the surfactant having the solubility of more than 5.0 g/100 ml, the hydrophobic group is not very effective, which exerts poor effect on stable dispersion of the vinyl monomer in the aqueous medium. Thus, if the above surfactant is used, a large amount of surfactant is required to stably disperse the vinyl monomer in the aqueous medium in the polymerization process when the liquid medium is the aqueous medium, which is not preferable in respect of productivity.

The amount of the surfactant used in the polymerization of the vinyl monomer preferably falls within the range of 0.01 to 5 parts by weight with respect to 100 parts by weight of vinyl monomer used. If the amount of surfactant used is less than the above range, the polymerization stability may be reduced. In contrast, if the amount of surfactant used is more than the above range, it is uneconomical in terms of cost.

A polymerization initiator may be added, if necessary, to the vinyl monomer. The polymerization initiator may firstly be mixed with the vinyl monomer, so that the obtained mixture is dispersed in the aqueous medium. Or, the polymerization initiator and the vinyl monomer may individually be dispersed in the respective aqueous media, so that the obtained dispersion liquids are mixed. In the polymerization reaction system of the vinyl monomer, a polymerization initiator is used as necessary. The polymerization initiator is not particularly limited, however, examples of the polymerization initiator include: organic peroxides such as benzoyl peroxide, lauroyl peroxide, o-chloro benzoyl peroxide, o-methoxy benzoyl peroxide, 3,5,5-trimethyl hexanoyl peroxide, t-butyl peroxy-2-ethyl hexanoate, and di-tert-butyl peroxide; and azo compounds such as 2,2'-azobis isobutyronitrile, 2,2'-azobis(2,4-dimethyl valeronitrile), 2,2'-azobis (2,3-dimethyl butyronitrile), 2,2'-azobis(2-methyl butyronitrile), 2,2'-azobis(2,3,3-trimethyl butyronitrile), 2,2'-azobis (2-isopropyl butyronitrile), 1,1'-azobis(cyclohexane-1-carbonitrile), 2,2'-azobis(4-methoxy-2,4-dimethyl valeronitrile), (2-carbamoylazo)isobutyronitrile, 4,4'-azobis (4-cyanovaleric acid) and dimethyl-2,2'-azobis isobutyrate. The amount of the polymerization initiator used preferably falls within the range of 0.1 to 1.0 part by weight with respect to 100 parts by weight of vinyl monomer.

In the polymerization reaction system of the vinyl monomer, a dispersant is used as necessary. Examples of the dispersant include: soluble and poorly water soluble inorganic compounds such as calcium phosphate, and magnesium pyrophosphate; and water soluble polymers such as polyvinyl alcohol, polyvinyl pyrrolidone, celluloses (e.g. hydroxyethyl cellulose and carboxymethyl cellulose), and polycarboxylic acid. A single kind of the above dispersant may be used, or two or more kinds of the above dispersants may also be used in combination. The amount of the dispersant added preferably falls within the range of 1 to 10 parts by weight with respect to 100 parts by weight of vinyl monomer.

In the polymerization reaction system of the vinyl monomer, an antioxidant such as pentaerythritol tetrakis[3-(3,5-di-tert-butyl-4-hydroxyphenyl)propionate] may be used as necessary.

In the polymerization reaction system of the vinyl monomer, a molecular weight modifier may be used so as to adjust the weight-average molecular weight of the polymer particles to be obtained. Examples of the molecular weight modifier include: mercaptans such as n-octyl mercaptan, n-dodecyl mercaptan, and tert-dodecyl mercaptan; α-methyl styrene dimer; terpenes such as γ-terpinene, and dipentene; and halogenated hydrocarbons such as chloroform, and carbon tetrachloride. By adjusting the amount of the molecular weight modifier to be used, it is possible to adjust the weight-average molecular weight of the polymer particles to be obtained.

Also, in order to reduce generation of emulsion polymerization products in the aqueous medium in the polymerization, a water soluble polymerization inhibitor may be added to the aqueous medium. Examples of the water-soluble polymerization inhibitor include: nitrites such as sodium nitrite; sulfites; hydroquinones; ascorbic acids; water-soluble vitamins B; citric acid; and polyphenols.

The polymerization temperature of the vinyl monomer can be appropriately selected depending on the kind of the vinyl monomer and the kind of the polymerization initiator used in case of necessity. The above polymerization reaction may be performed under an inert gas (such as nitrogen) atmosphere, which is inert for the polymerization.

The method for polymerizing the vinyl monomer is not particularly limited, provided that it is a publicly known polymerizing method using a liquid medium and a surfactant. Examples of the polymerizing method include: seed polymerization; emulsion polymerization; and suspension polymerization. Among the polymerizing methods, the suspension polymerization is most preferable because with this method, it is possible to easily obtain polymer particles having the coefficient of variation in the volume-based particle diameter distribution in the range from not less than 13.0% to not more than 25.0%.

The suspension polymerization is a polymerizing method in which the vinyl monomer and the aqueous medium such as water are mechanically stirred so as to polymerize the vinyl monomer suspended in the aqueous medium. The suspension polymerization has an advantageous feature that it is possible to obtain the polymer particles respectively having small particle diameters that are relatively similar to one another. In the suspension polymerization, it is preferable to use a dispersant constituted by soluble and poorly water soluble inorganic compounds because with such a dispersant, it is possible to easily obtain the polymer particles having the coefficient of variation in the volume-based particle diameter distribution in the range from not less than 13.0% to not more than 25.0%.

After termination of the polymerization, the following processes are performed as necessary: a dissolving process for dissolving the dispersant constituted by the soluble and poorly water soluble inorganic compounds by adding acid (for example, hydrochloric acid); a solid-liquid separation process such as a filtering process; a cleaning process; a drying process; and a pulverizing process. After that, the classification is performed. Thus, the polymer particles of the present invention can be obtained. When manufacturing the polymer particles having the volume average particle diameter in the range from not less than 2 μm to not more than 4 μm, the cake obtained by the solid-liquid separation (deliquoring) process after the dissolving process may be re-slurried with the water, and cleaned again by the water after further addition of acid (for example, hydrochloric acid). In this way, it is possible to sufficiently remove the dispersant and inorganic substances derived from the dispersant, and to reduce the content of the fine particles such as emulsion polymerization products. Thus, it is possible to easily obtain the polymer particle of the present invention in which the concentration of the non-volatile components is less than 3.5 wt. %.

The cleaning solution used in the cleaning process is preferably an aqueous medium. Examples of the cleaning solution include: water; lower alcohols (having a carbon number of 5 or less) such as methyl alcohol and ethyl alcohol; and a mixture of water and lower alcohol. However, it is preferable to use the cleaning solution similar to the medium that is used in the polymerization process. The weight of the cleaning solution used in the cleaning process is preferably 2 times or more the weight of the polymer particles, and more preferably 4 times or more the weight of the polymer particles. Thus, it is possible to easily obtain the polymer particles of the present invention in which the concentration of the non-volatile components is less than 3.5 wt. %, and also to easily obtain the polymer particles of the present invention that contain a small amount of surfactant per unit surface area (in particular the polymer particles of the present invention containing 10 to $250\times10^{-5}$ $g/m^2$ of surfactant per unit surface area).

The classification method of the polymer particles is not particularly limited provided that the small particles and the large particles can be removed by the classification. Examples of the classification method include: an air flow classification (air classification); and a screen classification (sieve classification). The air flow classification is preferable because with this method, the polymer particles having small particle diameters can be classified without clogging. The air flow classification is a method for classifying the particles using air flow. The screen classification is a method for classifying the particles provided on a screen into particles that pass through the mesh of the screen and particles that do not pass through the mesh of the screen by vibrating the screen.

The air flow classification includes the following methods: (1) discharging the polymer particles along with air flow so that the polymer particles hit the screen and are classified into the polymer particles that pass through the mesh of the screen and the polymer particles that do not pass through the mesh of the screen; (2) flowing the polymer particles with swirl air flow so as to classify the polymer particles into two groups respectively constituted by the polymer particles having large particle diameters and the polymer particles having small particle diameters by interaction of the centrifugal force given to the polymer particles from the swirl air flow and the air flowing toward the center of the swirl of the air flow; and (3) classifying the polymer particles using the Coanda effect. Examples of the commercially available air flow classifiers performing the above air flow classification (1) include: trade name "BLOWER SIFTER" manufactured by Yougrop Co., LTD; trade name "Hi-Bolter" manufactured by Toyo Hitec Co., Ltd; and trade name "Micro Sifter" manufactured by MAKINO mfg. co., ltd. Examples of the commercially available air flow classifiers performing the above air flow classification (2) include: trade name "Turbo Classifier (registered trademark)" manufactured by Nisshin Engineering Inc.; and trade name "Spedic Classifier" manufactured by SEISHIN ENTERPRISE CO., Ltd. Examples of the commercially available air flow classifiers performing the above air flow classification (3) include a Coanda type air flow classifier (Elbow-Jet Air Classifier) distributed by MATSUBO Corporation. The above three classification methods may be selected and used depending on properties of the polymer particles to be classified and/or a desired level of removal of coarse particles and fine particles. It is preferable to use the air flow classifier performing the classification method (2) when the polymer particles have a high adhesiveness and/or when it is desired to achieve high accuracy in removal level of coarse particles and fine particles.

Use of Polymer Particles

The polymer particles of the present invention is suitable for optical films such as an anti-glare film and a light diffusion film, and for a light diffusing agent for an optical member such as a light diffuser. They are particularly suitable for a light diffusing agent for a light diffusion film (especially, a light diffusion film for a liquid crystal display).

Resin Composition

A resin composition of the present invention contains the polymer particles of the present invention. Examples of the resin compositions of the present invention include: a resin composition for coating; and a resin composition for molding. However, the resin composition of the present invention is particularly suitable for a resin composition for coating. The resin composition for coating preferably contains a binder in addition to the polymer particles of the present invention. The resin composition for molding preferably contain the polymer particles of the present invention and a transparent resin. The resin composition for coating and the resin composition for molding will be described hereinafter in detail.

Optical Film and Resin Composition for Coating

An optical film of the present invention includes a base film and a coating formed on the base film, and the coating contains the polymer particles of the present invention. The optical film of the present invention is obtained, for example, by the following processes: dispersing the polymer particles in a binder so as to obtain a resin composition for coating; applying the obtained resin composition for coating (i.e. a coating agent) onto the film base material so as to form a coating film constituted by the resin composition for coating (more exactly, solid content thereof) on the film base material.

The binder is not particularly limited provided that it is used in the relevant technical field according to required properties such as transparency, polymer particle dispersibility, light stability, humidity resistance and heat resistance. Examples of the binder include binder resins such as: a (meth)acrylic resin; a (meth)acrylic-urethane resin; an urethane resin; a polyvinyl chloride resin; a polyvinylidene chloride resin; a melamine resin; a styrene resin; an alkyd resin; a phenolic resin; an epoxy resin; a polyester resin; a chlorinated polyolefin resin; an amorphous polyolefin resin; silicone resins such as an alkyl polysiloxane resin; modified silicone resins such as a (meth)acrylic-silicone resin, a silicone-alkyd resin, a silicone-urethane resin, and a silicone-polyester resin; and fluororesins such as a polyvinylidene fluoride, and a fluoroolefin vinylether polymer.

The binder resin is preferably a curable resin that can form a cross-linked structure by cross-linking reaction in respect of improvement of durability of the resin composition for coating. The curable resin can cure under various curing conditions. The curable resin is classified, depending on curing manners, into: a UV-curable resin; ionizing radiation-curable resins such as an electron beam-curable resin; a thermosetting resin; and a warm temperature-curable resin.

Examples of the thermosetting resin include: a thermosetting urethane resin constituted by acrylic polyol and isocyanate prepolymer; phenolic resin; a urea melamine resin; an epoxy resin; an unsaturated polyester resin; and a silicone resin.

Examples of the ionizing radiation-curable resin include: polyfunctional (meth)acrylate resins such as polyhydric alcohol polyfunctional (meth)acrylate; and polyfunctional urethane acrylate resins synthesized, for example, from diisocyanate, polyhydric alcohol, and (meth)acrylic acid ester having a hydroxyl group.

The amount of the polymer particles in the resin composition for coating preferably falls within the range of 10 to 300 parts by weight with respect to 100 parts by weight of solid content of the binder.

The resin composition for coating may further contain an organic solvent. The organic solvent is not particularly limited provided that, when applying the resin composition for coating onto a base material such as a film base material (described later), the resin composition that contains the organic solvent is more easily applied onto the base material. Examples of the organic solvent include: aromatic solvents such as toluene, and xylene; alcohol solvents such as methyl alcohol, ethyl alcohol, n-propyl alcohol, isopropyl alcohol, n-butyl alcohol, isobutyl alcohol, and propylene glycol monomethyl ether; ester solvents such as ethyl acetate, and butyl acetate; and ketone solvents such as acetone, methyl ethyl ketone, methyl isobutyl ketone, cyclopentanone, and cyclohexanone.

The film base material is preferably transparent. Examples of the transparent film base material include a film made of the following polymers: polyester polymers such as polyethylene terephthalate (PET), and polyethylene naphthalate; cellulose polymers such as diacetyl cellulose, and triacetyl cellulose (TAC); polycarbonate polymers; and (meth)acrylic polymers such as polymethyl methacrylate. Examples of the transparent film base material also include a film made of the following polymers: styrene polymers such as polystyrene, and acrylonitrile-styrene co-polymer; olefin polymers such as polyethylene, polypropylene, polyolefin having a cyclic or norbornene structure, and ethylene-propylene co-polymer; vinyl chloride polymers; and amide polymers such as nylon, and aromatic polyamide. Examples of the transparent film base material furthermore include a film made of the following polymers: imide polymers; sulfone polymers; polyether sulfone polymers; polyether ether ketone polymers; polyphenyl sulfide polymers; vinyl alcohol polymers; vinylidene chloride polymers; vinyl butyral polymers; arylate polymers; polyoxymethylene polymers; epoxy polymers; and blend of the above-described polymers. The film base material having a low birefringence is suitably used.

The thickness of the film base material may be appropriately set, however, generally it is set in the range of 10 to 500 µm in consideration of strength, workability such as easiness to handle, and layer thinness. The thickness of the film base material preferably falls within the range of 20 to 300 µm, and more preferably within the 30 to 200 µm.

Furthermore, an additive may be added to the film base material. Examples of the additive include: ultraviolet absorber; infrared absorber; antistatic agent; refractive index matching agent, and enhancer.

Examples of the method for applying the resin composition for coating onto the film base material include the following publicly known methods: bar coating; blade coating; spin coating; reverse coating; die coating; spray coating; roll coating; gravure coating; micro gravure coating; lip coating; air knife coating; and dipping.

In the case that the binder contained in the resin composition for coating is the ionizing radiation-curable resin, the solvent can be dried, if necessary, after application of the resin composition for coating, so that the ionizing radiation-curable resin can cure by receiving emitted active energy ray.

Examples of the active energy ray include: ultraviolet rays emitted from the light source such as a xenon lamp, a low-pressure mercury lamp, a high-pressure mercury lamp, an ultrahigh-pressure mercury lamp, a metal halide lamp, a carbon arc lamp, and a tungsten lamp; and electron beam, $\alpha$ ray, $\beta$ ray, and $\gamma$ ray generally having 20 to 2000 KeV that are extracted from an electron beam accelerator such as a Cockcroft-Walton type, a Van de Graaff type, a resonance transformer type, an isolated core transformer type, a linear type, a dynamitron type, and a high-frequency type.

The thickness of the layer in which the polymer particles are dispersed in the binder formed by applying (and curing) of the resin composition for coating is not particularly limited, and it may be appropriately set according to the particle diameter of the polymer particles. However, the thickness of the layer preferably falls within the range of 1 to 50 µm, and more preferably, within the range of 3 to 30 µm.

The optical film of the present invention can be suitably used for the light-diffusing purpose or anti-glare purpose, that is, it can be suitably used as a light diffusion film or an anti-glare film.

The film base material is preferably transparent. Examples of the transparent film base material include a film made of the following polymers: polyester polymers such as polyethylene terephthalate (PET), and polyethylene naphthalate; cellulose polymers such as diacetyl cellulose, and triacetyl cellulose (TAC); polycarbonate polymers; and (meth)acrylic polymers such as polymethyl methacrylate. Examples of the transparent film base material also include a film made of the following polymers: styrene polymers such as polystyrene, and acrylonitrile-styrene co-polymer; olefin polymers such as polyethylene, polypropylene, polyolefin having a cyclic or norbornene structure, and ethylene-propylene co-polymer; vinyl chloride polymers; and amide polymers such as nylon, and aromatic polyamide. Examples of the transparent film base material furthermore include a film made of the following polymers: imide polymers; sulfone polymers; polyether sulfone polymers; polyether ether ketone polymers; polyphenyl sulfide polymers; vinyl alcohol polymers; vinylidene chloride polymers; vinyl butyral polymers; arylate polymers; polyoxymethylene polymers; epoxy polymers; and blend of the above-described polymers. The film base material having a low birefringence is suitably used.

The thickness of the film base material may be appropriately set, however, generally it is set in the range of 10 to 500 µm in consideration of strength, workability such as easiness to handle, and layer thinness. The thickness of the film base material preferably falls within the range of 20 to 300 µm, and more preferably within the 30 to 200 µm.

In the above description, the resin composition for coating is described with respect to the use thereof to manufacture the optical film. However, the resin composition for coating can be used for other purposes. When the resin composition for coating is used for other purposes, it may contain, as necessary, the following publicly known substances: a coating surface modifier; a fluidity modifier; an ultraviolet absorber; a light stabilizer; a curing catalyst; extender pigments; coloring pigments; metallic pigments; mica powder pigments; and dye.

Resin Molding

The polymer particles of the present invention can also be used in a resin molding. The resin molding is a molding of the resin composition for molding that contains the polymer particles of the present invention and a transparent resin. In the resin molding, the polymer particles function as a light diffusing agent. Therefore, the resin molding functions as a light diffuser such as a light diffusion plate, thus it can be used as an LED lighting cover and the like.

The transparent resin is a base material of the resin molding. Examples of the transparent resin include: a (meth) acrylic resin; a polycarbonate resin; a polystyrene resin; and a (meth)acrylic-styrene resin (co-polymer of (meth)acrylic acid ester and styrene). Among the above, the polystyrene resin or the (meth)acrylic-styrene resin are preferable as the transparent resin.

The amount of the polymer particles contained in the resin composition preferably falls within the range of 0.01 to 5 parts by weight with respect to 100 parts by weight of transparent resin, and more preferably, within the range of 0.1 to 5 parts by weight. To the resin composition, additives such as an ultraviolet absorber, an antioxidant, a heat stabilizer, a light stabilizer, and a fluorescent brightener may be added.

The thickness and shape of the resin molding may be appropriately selected according to intended use of the resin molding.

The resin molding can be obtained by melting/kneading the transparent resin and the polymer particles using a single screw extruder or a twin screw extruder. Also, the resin composition obtained by melting/kneading may be molded into a plate-like shape by a T-die or a roll unit so as to obtain the resin molding. Furthermore, the resin composition obtained by melting/kneading may be pelletized so that the pellet is molded into a plate shape by injection molding or press molding so as to obtain the resin molding.

The resin molding is a molding of the resin composition for molding that contains the polymer particles having an excellent uniform dispersibility of the present invention. Thus, the resin molding can have even and uniform optical properties (e.g. light diffusibility, anti-glare property, and light transmittance).

Surface Roughening Agent

The polymer particles of the present invention can be used as a surface roughening agent for a resin film that gives roughness to the surface of a resin film so as to prevent the respective surfaces of the resin film that comes contact with each other from tightly adhering and hardly being peeled (i.e. blocking) when, for example, the resin film is wound. Since the coefficient of variation in the volume-based particle diameter distribution of the polymer particles of the present invention is not more than 25%, a good anti-blocking effect can be obtained.

Examples of the resin film include a resin film made of the following resins: a polyester resin such as polyethylene terephthalate, and polyethylene naphthalate; a polyolefin resin such as a polyethylene resin, and polypropylene resin; a (meth)acrylic resin; a polystyrene resin; a polyether sulfone resin; a polyurethane resin; a polycarbonate resin; a polysulfone resin; a polyether resin; a polymethyl pentene resin; a polyether ketone resin; a (meth)acrylonitrile resin; a norbornene resin; an amorphous polyolefin resin; a polyamide resin; a polyimide resin; and a triacetyl cellulose resin.

When the polymer particles of the present invention are used as the surface roughening agent for a resin film, the polymer particles may be introduced to the resin film, or a coating agent containing the polymer particles may be applied onto the surface of the resin film.

External Preparation

The polymer particles of the present invention can also be used as a raw material for an external preparation. The external preparation of the present invention contains the polymer particles of the present invention.

The amount of the polymer particles contained in the external preparation may be appropriately set depending on the kind of the external preparation. However, the content preferably falls within the range of 0.1 to 50 wt. %, and more preferably, within the range of 0.3 to 30 wt. %. If the content of the polymer particles is less than 0.1 wt. % based on the total mass of external preparation, it may be difficult to expect an obvious effect by containing the polymer particles. In contrast, if the content of the polymer particles is more than 50 wt. %, it may also be difficult to expect a remarkable effect that matches the increase of the contained amount, which is undesirable in respect of production cost.

Examples of the external preparation include cosmetics and medicine for external use.

The cosmetics are not particularly limited provided that the cosmetics exert effects due to the contained polymer particles. Examples of the cosmetics include: liquid cosmetics such as pre-shave lotion, body lotion, facial lotion, cream, milk, body shampoo, and anti perspirant; cleaning cosmetics such as soap, and facial scrub; facial masks; shaving cream; powders; foundation such as powder foundation, emulsion type foundation, and liquid foundation; facial powder such as loose powder; lipstick; lip balm; rouge; eyebrow cosmetics; nail polish cosmetics; shampoo cosmetics; hair dye; hair dressing; aromatic cosmetics; dentifrice; bath preparations; sunscreen products; suntan products; and body cosmetics such as body powder, and baby powder.

The medicine for external use is not particularly limited provided that it is to apply onto skin. Examples of the medicine for external use include: medical cream; ointment; medical emulsion; and medical lotion.

Also, these external preparations may contain a generally used adhesive according to purposes, unless the effects of the present invention are adversely affected. Examples of the additive include: dispersion medium such as water, lower alcohol (alcohol having a carbon number of 5 or less, e.g. ethanol), and 1,3-butylene glycol; fats and oils, and waxes; hydrocarbon (e.g. vaseline and liquid paraffin); higher fatty acid (fatty acid having a carbon number of 12 or more, e.g. stearic acid); higher alcohol (alcohol having a carbon number of 6 or more, e.g. cetyl alcohol); sterol; fatty acid ester (e.g. myristic acid octyl dodecyl, oleic acid ester, and 2-ethylhexanoic acid cetyl); metal soap; moisturizer (e.g. polyethylene glycol such as polyethylene glycol 4000, and propylene glycol); anti-inflammatory agent (glycyrrhizic acid); surfactant (e.g. sorbitan sesquioleate); polymer compound; colorant pigment (e.g. iron oxide such as red iron oxide, yellow iron oxide, and black iron oxide); pigments; titanium oxide; clay minerals (talc, mica (e.g. white mica), sericite, titanium sericite, and aluminum magnesium silicate); perfume; preservative and germicide; antioxidant; ultraviolet absorber; pH adjuster (e.g. triethanol amine); and special blending additive.

EXAMPLES

Hereinafter, the present invention is described with reference to the Examples and the Comparative Examples. However, the present invention is not limited by the above Examples. First, each method for measuring the following is described: volume average particle diameters of seed particles used in some of the manufacturing methods of the polymer particles specified below; various characteristic values of the polymer particles obtained in the Manufacturing Examples of the polymer particles specified below; and various characteristic values of the polymer particles obtained in the Examples and the Comparative Examples.

[Methods for Measuring Volume Average Particle Diameter and Number Average Particle Diameter of Polymer Particles, and Coefficient of Variation in Volume-Based Particle Diameter Distribution and Coefficient of Variation in Number-Based Particle Diameter Distribution of Polymer Particles]

The volume average particle diameter (volume-based average particle diameter) of the polymer particles and the number average particle diameter (number-based average particle diameter) of the polymer particles are measured by Coulter Multisizer™ 3 (a measurement device manufactured by Beckman Coulter, Inc.). Note that the measurement is performed using the aperture calibrated according to the user's manual of Multisizer™ 3 issued by Beckman Coulter, Inc.

The aperture used for the measurement is appropriately selected according to the size of the polymer particles to be measured. The Current (aperture current) and Gain are appropriately set according to the size of the selected aperture. When the aperture having the size of 50 μm is selected, the Current (aperture current) is set to −800 and the Gain is set to 4.

As the measurement sample, the dispersion liquid is used, which is obtained by dispersing 0.1 g of polymer particles in 10 ml of 0.1 wt. % nonionic surfactant aqueous solution using a touch mixer ("TOUCHMIXER MT-31" manufactured by Yamato Scientific Co., Ltd.) and an ultrasonic cleaner ("ULTRASONIC CLEANER VS-150" manufactured by VELVO-CLEAR Co., Ltd.). During measurement, the content of a beaker is being loosely stirred to the extent that no air bubble enters. The measurement is terminated when the volume-based particle diameter distribution and the volume average particle diameter of the polymer particles, and the number-based particle diameter distribution and the number average particle diameter of the polymer particles have been measured for 100,000 (one hundred thousand) polymer particles. The volume average particle diameter of the polymer particles is the arithmetic mean of the volume-based particle diameter distribution of 100,000 (one hundred thousand) polymer particles. The number average particle diameter of the polymer particles is the arithmetic mean of the number-based particle diameter distribution of 100,000 (one hundred thousand) polymer particles.

The coefficient of variation in the volume-based particle diameter distribution of the polymer particles (hereinafter referred to as the "volume-based CV value") and the coefficient of variation in the number-based particle diameter distribution of the polymer particles (hereinafter referred to as "number-based CV value") are calculated by the following expressions:

Volume-based $CV$ value of the polymer particles= (Standard deviation in the volume-based particle diameter distribution of the polymer particles÷Volume average particle diameter of the polymer particles)×100

Number-based $CV$ value of the polymer particles= (Standard deviation in the number-based particle diameter distribution of the polymer particles÷Number average particle diameter of the polymer particles)×100

[Method for Calculating Value of (Number-Based CV Value)/(Volume-Based CV Value) of Polymer Particles]

The value obtained by dividing the number-based CV value of the polymer particles by the volume-based CV value of the polymer particles (i.e. (Number-based CV value)/(Volume-based CV value)) is calculated by dividing the number-based CV value measured using the above-described method by the volume-based CV value measured using the above-described method.

[Method for Calculating Maximum Particle Diameter in Volume-Based Particle Diameter Distribution of Polymer Particles]

The particle diameter with the cumulative volume percentage of 100% in the volume-based particle diameter distribution measured by the above-described method is set to the maximum particle diameter in the volume-based particle diameter distribution of the polymer particles (hereinafter referred to as the "volume-based maximum particle diameter").

[Method for Measuring Amount of Surfactant Contained in Polymer Particles]

In order to measure the amount of the surfactant contained in the polymer particles, the polymer particles are extracted by the solvent, and the content of the surfactant is measured using a liquid chromatography-tandem mass spectrometer (LC/MS/MS system).

The amount of the surfactant contained in the polymer particles was measured, in the Examples and the Comparative Examples described later, using "UHPLC ACCELA" or "Linear Ion Trap LC/MSn LXQ" as the LC/MS/MS system, both manufactured by Thermo Fisher Scientific Inc.

The polymer particles in the Examples and the Comparative Examples described later contain, as the surfactant, at least one of lauryl sulfuric acid salt, polyoxyethylene nonyl phenyl ether phosphoric acid salt, and di(2-ethylhexyl) sulfosuccinic acid salt. The amount of the surfactant contained in the polymer particles in the Examples and the Comparative Examples was measured by the method described below.

As the sample, about 0.10 g of polymer particles is accurately weighed in a centrifuge tube, and 5 mL of methanol is added as the extract using a volumetric pipette so as to sufficiently mix the polymer particles and the extract. The mixture is subjected to ultrasonic extraction at a room temperature for 15 minutes, and then is centrifuged at a rotational speed of 3500 rpm for 15 minutes. The obtained supernatant is used as a test solution.

The concentration of the surfactant in the test solution is measured using the LC/MS/MS system. Thus, the content of the surfactant (µg/g) in the polymer particles is obtained by the expression specified below using: the concentration of the surfactant (µg/mL) in the measured test solution; the weight of the polymer particles used as the sample (sample weight (g)); and the amount of the extract (extract amount (mL)). In this case, the extract amount is 5 ml.

Content of surfactant(µg/g)=

{Concentration of surfactant(µg/mL) in test solution× Extract amount(mL)}÷Sample weight(g).

The concentration of the surfactant is measured by the LC/MS/MS system, and the content of the surfactant is calculated by a calibration curve preliminarily produced from a peak area value on the obtained chromatogram. In the case that the polymer particles contain multiple kinds of surfactants, each calibration curve is produced for the corresponding surfactant, and the respective concentrations of the surfactants are calculated by the produced calibration curves. Thus, the sum of the calculated concentrations of the surfactants is used as the "concentration of surfactant (µg/mL) in test solution" in the above-described expression so as to obtain the amount of the surfactant contained in the polymer particles.

The method for producing the calibration curve is described as follows, depending on the kind of the surfactant used in the Examples and the Comparative Examples.

—Method for Producing Calibration Curve of Lauryl Sulfuric Acid Salt—

An intermediate standard solution containing lauryl sulfuric acid salt of about 1000 ppm (methanol solution) is prepared, and after that, the above solution is further diluted with methanol gradually so as to prepare standard solutions for preparing calibration curve containing respectively lauryl sulfuric acid salt of 0.1 ppm, 0.2 ppm, 0.5 ppm, 1.0 ppm and 2.0 ppm. The standard solutions for preparing calibration curve with respective concentrations are measured under the LC measurement condition and the MS measurement condition (both described later) so as to obtain a peak area value on the chromatogram that satisfies: monitoring ion m/z=421.3 (precursor ion)→227.2 (product ion). The respective concentrations and area values are plotted, and an approximate curve (secondary curve) is obtained by the least-squares method, which is set to the quantitative calibration curve.

—Method for Producing Calibration Curve of Polyoxyethylene Nonyl Phenyl Ether Phosphoric Acid Salt—

An intermediate standard solution containing polyoxyethylene nonyl phenyl ether phosphoric acid salt of about 1000 ppm (methanol solution) is prepared, and after that, the above solution is further diluted with methanol gradually so as to prepare standard solutions for preparing calibration curve containing respectively polyoxyethylene nonyl phenyl ether phosphoric acid salt of 0.1 ppm, 0.5 ppm, 1.0 ppm, 2.0 ppm and 10.0 ppm. The standard solutions for preparing calibration curve with respective concentrations are measured under the LC measurement condition and the MS measurement condition (both described later) so as to obtain a peak area value on the chromatogram that satisfies: monitoring ion m/z=502.3 (precursor ion)→485.2 (product ion). The respective concentrations and area values are plotted, and an approximate curve (secondary curve) is obtained by the least-squares method, which is set to the quantitative calibration curve.

—Method for Producing Calibration Curve of Di(2-Ethylhexyl)Sulfosuccinic Acid Salt—

An intermediate standard solution containing di(2-ethylhexyl)sulfosuccinic acid salt of about 1000 ppm (methanol solution) is prepared, and after that, the above solution is further diluted with methanol gradually so as to prepare standard solutions for preparing calibration curve containing respectively di(2-ethylhexyl)sulfosuccinic acid salt of 0.1 ppm, 0.2 ppm, 0.5 ppm, 1.0 ppm and 2.0 ppm. The standard solutions for preparing calibration curve with respective concentrations are measured under the LC measurement condition and the MS measurement condition (both described later) so as to obtain a peak area value on the chromatogram that satisfies: monitoring ion m/z=421.3 (precursor ion)→227.2 (product ion). The respective concentrations and area values are plotted, and an approximate curve (secondary curve) is obtained by the least-squares method, which is set to the quantitative calibration curve.

—LC Measurement Condition—

Measurement system: UHPLC ACCELA (manufactured by Thermo Fisher Scientific Inc.)

Column: Hypersil GOLD C18 1.9 μm (internal diameter: 2.1 mm, length: 100 mm) (manufactured by Thermo Fisher Scientific Inc.)

—MS Measurement Condition—

Measurement system: Linear Ion Trap LC/MSn LXQ (manufactured by Thermo Fisher Scientific Inc.)

Ionization: (ESI/negative)

Sheath gas: 30 arb

Auxiliary gas (AUX gas): 10 arb

Sweep gas: 0 arb

I spray voltage: 5.0 kV

Capillary temperature (capillary Temp): 350° C.

Capillary voltage: −20 V

Tube lens voltage: −100 V

Monitoring ion (m/Z):

lauryl sulfuric acid salt (n=421.3/n2=227.2);

polyoxyethylene nonyl phenyl ether phosphoric acid salt (n=502.3/n2=485.2); and di(2-ethylhexyl)sulfosuccinic acid salt (n=421.3/n2=227.2).

[Method for Measuring Specific Surface Area of Polymer Particles]

The specific surface area of the polymer particles was measured by the BET method (nitrogen adsorption method) according to ISO 9277, 1 and JIS Z 8830 (2001). BET nitrogen adsorption isotherm of the subject polymer particles was measured using a micromeritics automatic surface area and porosimetry analyzer "Tristar 3000" manufactured by SHIMADZU CORPORATION. Thus, the specific surface area was calculated from the amount of nitrogen adsorbed, using the BET multi-point method. After a pre-treatment of heated gas purge, the measurement was performed, using nitrogen as an adsorbate, by a constant volume method under a condition of a cross-sectional area of the adsorbate of 0.162 nm². The pre-treatment included, specifically, the following steps: performing the nitrogen purge for 20 minutes while heating a vessel containing the polymer particles at 65° C.; cooling the vessel in a room temperature; and re-heating the vessel at 65° C. while performing vacuum degassing until the pressure in the vessel was not more than 0.05 mmHg.

[Method for Calculating Surfactant Content Per Unit Surface Area of Polymer Particles]

The surfactant content per unit surface area of the polymer particles was obtained by the expression specified below using: the content of the surfactant in the polymer particles that was measured by the above measuring method; and the specific surface area of the polymer particles that was measured by the above measuring method:

(Surfactant content per unit surface area of polymer particles)($g/m^2$)

=(Surfactant content in polymer particles)($g$/1 $g$ of polymer particles)

÷Specific surface area of polymer particles($m^2$/1 $g$ of polymer particles).

[Method for Measuring Content of by-Products (Emulsion Polymerization Products) in Polymer Particles (i.e. Solvent Dispersion Method)]

When the polymer particles are dispersed in the water and centrifuged, the polymer particles having a target particle diameter settle out while by-products (emulsion polymerization products) contained in the polymer particles float and constitute a supernatant along with a small amount of water. Here, the content of the by-products (emulsion polymerization products) in the polymer particles as a result of the polymerization is measured as the content of the non-volatile components in the supernatant.

[Preparation of Supernatant]

First, the polymer particles in the amount of 5.0 g obtained in each of the Examples and the Comparative Examples are put in a sample bottle having the capacity of 50 mL, and the water in the amount of 15.0 g is added. After that, the mixture is subjected to a dispersion treatment for 60 minutes using an ultrasonic cleaner ("ULTRASONIC CLEANER VS-150" with oscillation frequency; 50 kHz and high-frequency output; 150 W, manufactured by VELVO-CLEAR Co., Ltd.) so as to disperse the polymer particles in the water. Thus, the dispersion liquid is obtained. If the polymer particles are hardly dispersed in the water, the polymer particles may be wet with a very small amount of alcohol (e.g. ethanol; upper limit; 0.8 g) before dispersing them in the water.

Next, the obtained dispersion liquid in the amount of 20.0 g is put in a centrifuge tube with the inside diameter of 24 mm (for example, a centrifuge tube with the capacity of 50 mL and the inside diameter of 24 mm, trade name "Nalgene (registered trade mark) 3119-0050", manufactured by Thermo Fisher Scientific Inc.), and the centrifuge tube is set in a rotor (for example, an angle rotor "RR 24A" in which 8 centrifuge tubes with the capacity of 50 mL are set, manufactured by Hitachi Koki Co., Ltd.). The rotor is set in a centrifugal separator (for example, a high-speed refrigerated centrifuge "CR22GII", manufactured by Hitachi Koki Co., Ltd.) and centrifuged by the high-speed refrigerated centrifuge under conditions that K factor is 6943 (when using the above angle rotor, K factor is 6943 at the time of rotational speed of 4800 rpm) and the rotating time is 30 minutes. After that, the supernatant is recovered.

[Quantitative Evaluation of By-products (Emulsion Polymerization Products)]

Next, the amount of the by-products (emulsion polymerization products) contained in the recovered supernatant in the amount of 5.0 g. Specifically, the supernatant in the amount of 5.0 g is measured and put in a sample bottle with the capacity of 10 mL, whose weight was measured in advance, and the sample bottle is put in a vacuum oven at the temperature of 60° C. for 5 hours so as to evaporate moisture. The weight (g) of the sample bottle containing a residue after evaporation and drying, i.e. the non-volatile components, is weighed.

Thus, the concentration (wt. %) of the non-volatile components (corresponding to the by-products (emulsion polymerization products) in the supernatant is calculated by the expression specified below using: the weight (g) of the sample bottle containing the non-volatile components; the weight (g) of the sample bottle; and the weight of the supernatant (g) put in the sample bottle (=5.0 g):

(Concentration of non-volatile components in supernatant)(*wt.* %)

={(Weight of sample bottle containing non-volatile components)(*g*)−(Weight of sample bottle)(*g*)}

÷(Weight of supernatant put in sample bottle)(*g*)× 100.

[Method for Measuring Gel Fraction of Polymer Particles]

The gel fraction of the polymer particles shows the cross-linking degree of the polymer particles, and is measured by the following method: accurately weighing 1.0 g of the polymer particles as the sample and 0.03 g of boiling stones so as to put them in an egg-plant shaped flask with the capacity of 200 mL, and further adding 100 mL of toluene therein; attaching a cooling tube to the egg-plant shaped flask; and soaking the egg-plant shaped flask in an oil bath maintained at the temperature of 130° C. so that the egg-plant shaped flask is subjected to reflux for 24 hours.

After subjected to the reflux, the content (solution) in the egg-plant shaped flask is filtered by a Büchner funnel filter 3G (with the glass particle pore diameter of 20 to 30 μm and the capacity of 30 mL) manufactured by TOP® (SOGO LABORATORY GLASS WORKS CO., LTD.). The Büchner funnel filter 3G was weighed in advance together with glass fiber filters attached thereto, i.e. "GB-140 (φ 37 mm)" and "GA-200 (φ 37 mm)" manufactured by ADVANTEC, MFS, INC. Then, the solid content is recovered in the Büchner funnel filter 3G. The solid content recovered in the Büchner funnel filter 3G is dried by putting the Büchner funnel filter 3G in the vacuum oven at 130° C. for 1 hour, and further is dried at the gauge pressure of 0.06 MPa for 2 hours so as to remove toluene. Then, the Büchner funnel filter 3G is cooled to the room temperature.

After cooling, the total weight of the Büchner funnel filter 3G containing the solid content is measured in the state in which the glass fiber filters are attached thereto. Thus, the weight (g) of dry powder is obtained by subtracting the weight of the Büchner funnel filter 3G and the glass fiber filters as well as the weight of the boiling stones from the measured total weight.

Thus, the gel fraction is calculated by the expression specified below using: the weight (g) of the dry powder; and the weight (g) of the sample put in the egg-plant shaped flask:

Gel fraction(*wt.* %)={Dry powder(*g*)/Sample weight (*g*)}×100

[Method for Measuring Refractive Index of Polymer Particles]

The refractive index of the polymer particles was measured by the Becke method. The polymer particles were placed on a microscope slide so that a refractive index liquid (Cargille standard refractive index liquid manufactured by Cargille laboratories, Inc.) was dripped. Multiple kinds of the above refractive index liquids had been prepared at the refractive index difference interval of 0.002 within the refractive index range (nD25) of 1.480 to 1.596. After the polymer particles and the refractive index liquid were well mixed, the contours of the polymer particles were observed from the above using an optical microscope while the rear surface of the microscope slide was irradiated with light of the high pressure sodium lamp "NX 35" (center wavelength: 589 nm) manufactured by IWASAKI ELECTLIC CO., LTD. Then, it was determined that the refractive index of the refractive index liquid equaled the refractive index of the polymer particles when the contours of the polymer particles could not be seen.

The observation may be performed by the optical microscope of any magnification without problem provided that the contours of the polymer particles can be confirmed. However, when observing the polymer particles having the particle diameter of 5 μm, it is suitable to observe them with the optical microscope of 500 magnifications. With the above-described operations, as the respective refractive indexes of the polymer particles and the refractive index liquid were close to each other, the contours of the polymer particles became difficult to see. Thus, the refractive index of the refractive index liquid that made the contours of the polymer particles difficult to see was determined to be equal with the refractive index of the polymer particles.

Also, when the visibility of the polymer particles was not different between the two kinds of refractive index liquids that differ from each other in the refractive index by 0.002, an intermediate value of the respective refractive indexes of the two kinds of refractive index liquids was determined to be the refractive index of the polymer particles. For example, when the observations were performed using respectively the refractive index liquids having the refractive indexes of 1.554 and 1.556 and when the visibility of the polymer particles is not different between the respective refractive index liquids, the intermediate value of 1.555 of the respective refractive index liquids was determined to be the refractive index of the polymer particles.

The above measurement was performed in an environment in which the temperature of the test laboratory of 23 to 27° C.

[Method for Measuring Number of Polymer Particles Having Particle Diameter in Range from not Less than 8 μm to not More than 10 μm, and Number of Polymer Particles Having Particle Diameter of More than 10 μm]

In the polymer particles in Example 3 described later, the number of the polymer particles having the particle diameter in the range from not less than 8 μm to not more than 10 μm and the number of the polymer particles having the particle diameter of more than 10 μm were measured using a flow type particle image analyzer (trade name "FPIA (registered trade mark)—3000S", manufactured by Sysmex Corporation).

The specific measuring method included the following: an aqueous surfactant solution was obtained by adding 0.05 g of surfactant (preferably alkyl benzene sulfonic acid salt) as a dispersant to 20 mL of deionized water. After that, 0.02 g of the polymer particles as the measuring object were added to the aqueous surfactant solution so that the solution was subjected to a dispersion treatment for 2 minutes to disperse the polymer particles in the aqueous surfactant solution using an ultrasonic cleaner as a disperser (e.g. "VS-150" manufactured by VELVO-CLEAR Co., Ltd.). Thus, the dispersion liquid for measurement was obtained.

The above flow type particle image analyzer on which a standard objective lens (of 10 magnifications) was mounted was used for measurement. As sheath liquid to be used in the flow type particle image analyzer, a particle sheath (trade name "PSE-900A", manufactured by Sysmex Corporation) was used. The dispersion liquid for measurement prepared according to the above procedures was introduced into the flow type particle image analyzer, and the measurement was performed under the conditions as follows:

Measurement mode: LPF measurement mode
Measurement range of particle diameter: 0.5-200 μm
Number of polymer particles measured: 300,000 (three hundred thousand)
Measurement range of circularity of particles: 0.97-1.0

Before the measurement, an automatic focusing of the flow type particle image analyzer was performed using a suspension liquid containing a standard polymer particle group (e.g. "5200A" manufactured by Thermo Fisher Scientific Inc., suspension liquid made by diluting a standard polystyrene particle group with deionized water).

Among the particle diameters of 300,000 (three hundred thousand) polymer particles subjected to measurement by the above method, the following were counted: the number of the polymer particles having the particle diameter in the range from not less than 8 μm to not more than 10 μm; and the number of the polymer particles having the particle diameter of more than 10 μm.

Manufacturing Example 1 of Polymer Particles

In the high-speed emulsifying disperser (trade name "HOMOGENIZING MIXER MARK II MODEL 2.5" manufactured by Primix Corporation), the following were fed: a monomer composition constituted by 90 parts by weight of methyl methacrylate as a (meth)acrylic acid ester monomer, 10 parts by weight of ethylene glycol dimethacrylate as a polyfunctional vinyl monomer, and 0.4 part by weight of benzoyl peroxide as a polymerization initiator; 200 parts by weight of deionized water as an aqueous medium; 5 parts by weight of double-decomposed magnesium pyrophosphate (magnesium pyrophosphate obtained by double decomposition) as a dispersion stabilizer constituted by an acid soluble and poorly water soluble inorganic compound; and 0.05 part by weight of sodium lauryl sulfate and 0.05 part by weight of polyoxyethylene nonyl phenyl ether sodium phosphate as a surfactant. They were mixed and adjusted so as to have a droplet diameter of about 15 μm. Thus, a dispersion liquid was obtained, in which the monomer composition was uniformly dispersed in the deionized water.

The dispersion liquid was fed in a polymerization reactor having a stirrer and a thermometer, and the suspension polymerization was performed at 70° C. for 3 hours while stirring the dispersion liquid by the stirrer. Thus, a suspension liquid was obtained, in which cross-linked polymethyl methacrylate particles as the polymer particles were dispersed in the water.

Hydrochloric acid was added to the suspension liquid so as to dissolve the dispersion stabilizer (double-decomposed magnesium pyrophosphate). After that, the suspension liquid was fed in a centrifugal dehydrator in which an inner basket includes a filtering cloth, and the basket was rotated for 30 minutes so as to have the centrifugation effect of 700 G, thus deliquoring was performed to obtain cake containing the cross-linked polymethyl methacrylate particles. After that, 500 parts by weight of deionized water was added in the basket so as to clean the cake for 30 minutes while rotating the basket so as to have the centrifugation effect of 700 G, and the basket was rotated for further 60 minutes. Thus, the cake containing the cross-linked polymethyl methacrylate particles was obtained. The obtained cake was dried and the cross-linked polymethyl methacrylate particles were obtained.

The obtained cross-linked polymethyl methacrylate particles had the volume average particle diameter of 14.4 μm, the coefficient of variation in the volume-based particle diameter distribution of 44.3%, the number average particle diameter of 7.5 μm, the coefficient of variation in the number-based particle diameter distribution of 55.8%, the value of (number-based CV value)/(volume-based CV value) of 1.26, and the volume-based maximum particle diameter of 60.8 μm.

Manufacturing Example 2 of Polymer Particles

The cross-linked polymethyl methacrylate particles as the polymer particles were obtained in the same way as Manufacturing Example 1 of the polymer particles except for changing the amount of sodium lauryl sulfate to 0.2 part by weight and the amount of polyoxyethylene nonyl phenyl ether sodium phosphate to 0.25 part by weight.

The obtained cross-linked polymethyl methacrylate particles had the volume average particle diameter of 6.2 μm, the volume-based CV value of 48.6%, the number average particle diameter of 3.9 μm, the number-based CV value of 43.4%, the value of (number-based CV value)/(volume-based CV value) of 0.89, and the volume-based maximum particle diameter of 29.6 μm.

Manufacturing Example 3 of Polymer Particles

In the high-speed emulsifying disperser (trade name "HOMOGENIZING MIXER MARK II MODEL 2.5" manufactured by Primix Corporation), the following were fed: a monomer composition constituted by 70 parts by weight of methyl methacrylate as a (meth)acrylic acid ester monomer, 30 parts by weight of ethylene glycol dimethacrylate as a polyfunctional vinyl monomer, 0.8 part by weight of 2,2'-azobis(2,4-dimethyl valeronitrile) and 0.4 part by weight of benzoyl peroxide as a polymerization initiator, 0.3 part by weight of n-dodecyl mercaptan as a molecular weight modifier (chain transfer agent), and 0.4 part by weight of pentaerythritol tetrakis[3-(3,5-di-tert-butyl-4-hydroxyphenyl)propionate] (trade name "SONG-NOX (registered trade mark) 1010" manufactured by Songwon Industrial Co., Ltd.) as an antioxidant; 297 parts by weight of deionized water as an aqueous medium; 8.6 parts by weight of double-decomposed magnesium pyrophosphate as a dispersion stabilizer constituted by an acid soluble and poorly water soluble inorganic compound; and 0.28 part by weight of polyoxyethylene nonyl phenyl ether sodium phosphate as a surfactant. They were mixed so as to have a droplet diameter of about 3 μm. Thus, a primary suspension liquid was obtained, in which the monomer composition was uniformly dispersed as droplets having the droplet diameter of about 3 μm in the deionized water. Furthermore, the primary suspension liquid was fed in a high-pressure dispersing device (trade name "NANO-MIZER (registered trade mark) LA-33" manufactured by NANOMIZER Inc.) that includes a suspension dispersing tool (trade name "LNP-20/300" manufactured by NANO-MIZER Inc.) so as to micronize the droplets of the monomer composition by applying an impact under a high pressure of 29.4 Mpa. Thus, a secondary suspension liquid was obtained.

The secondary suspension liquid was fed in a polymerization reactor having a stirrer and a thermometer, and suspension polymerization was performed at 70° C. for 3 hours while stirring the secondary suspension liquid by the stirrer. Thus, a suspension liquid was obtained, in which cross-linked polymethyl methacrylate particles as the polymer particles were dispersed in the water.

Hydrochloric acid aqueous solution was added to the suspension liquid so as to dissolve magnesium pyrophosphate. After that, the suspension liquid was subjected to centrifugal filtration for 10 minutes so as to have the centrifugation effect of 1000 G, thus deliquoring was performed to obtain cake. After this cake was re-slurried with 300 parts by weight of water, hydrochloric acid aqueous solution was further added and adjusted so that pH of the system was in a strong acid region. After that, the suspension liquid was fed in a centrifugal dehydrator in which an inner basket includes a filtering cloth, and the basket was rotated for 30 minutes so as to have the centrifugation effect of 1000 G, thus deliquoring was performed. Then, 900 parts by weight of deionized water was added in the basket so as to clean the cake for 30 minutes while rotating the basket so as to have the centrifugation effect of 1000 G, and the basket was rotated for further 60 minutes. Thus, the cake containing the cross-linked polymethyl methacrylate particles was obtained. The obtained cake was dried and the cross-linked polymethyl methacrylate particles were obtained.

The obtained cross-linked polymethyl methacrylate particles had the volume average particle diameter of 2.8 μm, the volume-based CV value of 32.0%, the number average particle diameter of 2.6 μm, the number-based CV value of 30.0%, the value of (number-based CV value)/(volume-based CV value) of 0.94, and the volume-based maximum particle diameter of 18.5 μm.

Manufacturing Example 4 of Polymer Particles

The cross-linked polymethyl methacrylate particles as the polymer particles were obtained in the same way as Manufacturing Example 1 of the polymer particles except for: changing the amount of double-decomposed magnesium pyrophosphate to 4 parts by weight, the amount of sodium lauryl sulfate to 0.05 part by weight and the amount of polyoxyethylene nonyl phenyl ether sodium phosphate to 0.03 part by weight; and adjusting the droplet diameter to about 18 μm by the "HOMOGENIZING MIXER MARK II MODEL 2.5".

The obtained cross-linked polymethyl methacrylate particles had the volume average particle diameter of 17.7 μm, the volume-based CV value of 38.9%, the number average particle diameter of 7.8 μm, the number-based CV value of 66.5%, the value of (number-based CV value)/(volume-based CV value) of 1.71, and the volume-based maximum particle diameter of 59.2 μm.

Manufacturing Example 5 of Polymer Particles

The cross-linked methyl methacrylate-styrene co-polymer particles as the polymer particles were obtained in the same way as Manufacturing Example 1 of the polymer particles except for: adding 10 parts by weight of styrene as a styrene monomer to the monomer composition; changing the amount of methyl methacrylate to 80 parts by weight, the amount of double-decomposed magnesium pyrophosphate to 6.5 parts by weight, the amount of sodium lauryl sulfate to 0.25 part by weight and the amount of polyoxyethylene nonyl phenyl ether sodium phosphate to 0.25 part by weight; adjusting the droplet diameter to about 4 μm by the "HOMOGENIZING MIXER MARK II MODEL 2.5"; and performing the suspension polymerization for 8 hours.

The obtained cross-linked methyl methacrylate-styrene co-polymer particles had the volume average particle diameter of 4.4 μm, the coefficient of variation in the volume-based particle diameter distribution of 47.2%, the number average particle diameter of 3.1 μm, the coefficient of variation in the number-based particle diameter distribution of 40.9%, the value of (number-based CV value)/(volume-based CV value) of 0.87, and the volume-based maximum particle diameter of 20.7 μm.

Manufacturing Example 6 of Polymer Particles

In the high-speed emulsifying disperser (trade name "HOMOGENIZING MIXER MARK II MODEL 2.5" manufactured by Primix Corporation), the following were fed: 95 parts by weight of methyl methacrylate as a (meth) acrylic acid ester monomer; 5 parts by weight of ethylene glycol dimethacrylate as a polyfunctional vinyl monomer; 0.5 part by weight of benzoyl peroxide as a polymerization initiator; 300 parts by weight of deionized water as an aqueous medium; 5 parts by weight of double-decomposed magnesium pyrophosphate as a dispersion stabilizer constituted by an acid soluble and poorly water soluble inorganic compound; and 0.15 part by weight of sodium lauryl sulfate and 0.10 part by weight of polyoxyethylene nonyl phenyl ether sodium phosphate as a surfactant. They were mixed so as to have a droplet diameter of about 8 μm. Thus, a primary suspension liquid was obtained, in which the monomer composition was uniformly dispersed as droplets having the droplet diameter of about 8 μm in the deionized water. Furthermore, the primary suspension liquid was fed in the high-pressure dispersing device (trade name "NANOMIZER (registered trade mark) LA-33" manufactured by NANOMIZER Inc.) that includes a suspension dispersing tool (trade name "LNP-20/300" manufactured by NANOMIZER Inc.) so as to micronize the droplets of the monomer composition by applying an impact under a high pressure of 29.4 Mpa. Thus, a secondary suspension liquid was obtained.

The secondary suspension liquid was fed in a polymerization reactor having a stirrer and a thermometer, and the suspension polymerization was performed at 70° C. for 3 hours while stirring the secondary suspension liquid by the stirrer. Thus, a suspension liquid was obtained, in which the cross-linked polymethyl methacrylate particles as the polymer particles were dispersed in the water.

Hydrochloric acid was added to the suspension liquid so as to dissolve double-decomposed magnesium pyrophosphate. After that, the suspension liquid was fed in a centrifugal dehydrator in which an inner basket includes a filtering cloth, and the basket was rotated for 30 minutes so as to have the centrifugation effect of 700 G, thus deliquoring was performed to obtain cake containing the cross-linked polymethyl methacrylate particles. After that, 500 parts by weight of deionized water was added in the basket so as to clean the cake for 30 minutes while rotating the basket so as to have the centrifugation effect of 700 G, and the basket was rotated for further 60 minutes. Thus, the cake containing the cross-linked polymethyl methacrylate particles was obtained. The obtained cake was dried and the cross-linked polymethyl methacrylate particles were obtained.

The obtained cross-linked polymethyl methacrylate particles had the volume average particle diameter of 8.4 μm, the volume-based CV value of 25.7%, the number average particle diameter of 6.0 μm, the number-based CV value of 37.1%, the value of (number-based CV value)/(volume-based CV value) of 1.44, and the volume-based maximum particle diameter of 29.0 μm.

Manufacturing Example 7 of Polymer Particles

The cross-linked polybutyl acrylate particles as the polymer particles were obtained in the same way as Manufacturing Example 1 of the polymer particles except for: using butyl acrylate as a (meth)acrylic acid ester monomer in place of methyl methacrylate; using polyethylene glycol (600) dimethacrylate as a polyfunctional vinyl monomer in place of ethylene glycol dimethacrylate; changing the amount of double-decomposed magnesium pyrophosphate to 3.5 parts by weight, the amount of sodium lauryl sulfate to 0.04 part by weight and the amount of polyoxyethylene nonyl phenyl ether sodium phosphate to 0.03 part by weight; and adjusting the droplet diameter to about 30 μm by the "HOMOGENIZING MIXER MARK II MODEL 2.5".

The obtained polybutyl acrylate particles had the volume average particle diameter of 29.9 μm, the volume-based CV value of 36.2%, the number average particle diameter of 17.1 μm, the number-based CV value of 42.2%, the value of (number-based CV value)/(volume-based CV value) of 1.17, and the volume-based maximum particle diameter of 81.3 μm.

Example 1

The polymer particles (cross-linked polymethyl methacrylate particles) obtained in Manufacturing Example 1 of the polymer particles were fed in a classification rotor type air flow classifier (trade name "Turbo Classifier (registered trademark) TC-25" manufactured by Nisshin Engineering Inc.), and subjected to classification by the classification rotor type air flow classifier using a coarse powder rotor as the classification rotor so that the value of (number-based CV value)/(volume-based CV value) was within the range of 1.0 to 3.5. Thus, 30 wt. % of coarse powder (coarse polymer particles) was removed from the polymer particles. Sequentially, the above treated polymer particles were subjected to classification by the classification rotor type air flow classifier using a fine powder rotor as the classification rotor so that the value of (number-based CV value)/(volume-based CV value) was within the range of 1.0 to 3.0. Thus, 30 wt. % of fine powder (fine polymer particles) was removed from the polymer particles. In this way, the cross-linked polymethyl methacrylate particles, which are an example of the polymer particles of the present invention, were obtained.

The obtained cross-linked polymethyl methacrylate particles had the volume average particle diameter of 13.5 μm, the volume-based CV value of 15.7%, the number average particle diameter of 12.0 μm, the number-based CV value of 24.3%, the value of (number-based CV value)/(volume-based CV value) of 1.55, and the volume-based maximum particle diameter of 24.0 μm. Also, the obtained cross-linked polymethyl methacrylate particles had the refractive index of 1.495, the gel fraction of 98.1 wt. %, the non-volatile component concentration of 0.5 wt. %, and the surfactant content per unit surface area of the polymer particles of $67 \times 10^{-5}$ g/m$^2$.

Example 2

The polymer particles (cross-linked polymethyl methacrylate particles) obtained in Manufacturing Example 2 of the polymer particles were fed in a Coanda type air flow classifier (Elbow-Jet Air Classifier, type: EJ-PURO, manufactured by Nittetsu Mining Co., Ltd. and distributed by MATSUBO Corporation), and subjected to classification by the Coanda type air flow classifier so that the value of (number-based CV value)/(volume-based CV value) was within the range of 1.0 to 3.5. Thus, 25 wt. % of coarse powder and 30 wt. % of fine powder were removed from the polymer particles. In this way, the cross-linked polymethyl methacrylate particles, which are an example of the polymer particles of the present invention, were obtained.

The obtained cross-linked polymethyl methacrylate particles had the volume average particle diameter of 5.0 μm, the volume-based CV value of 23.6%, the number average particle diameter of 4.0 μm, the number-based CV value of 31.2%, the value of (number-based CV value)/(volume-based CV value) of 1.30, and the volume-based maximum particle diameter of 15.8 μm. Also, the obtained cross-linked polymethyl methacrylate particles had the refractive index of 1.495, the gel fraction of 98.3 wt. %, the non-volatile component concentration of 3.1 wt. %, and the surfactant content per unit surface area of the polymer particles of $225 \times 10^{-5}$ g/m$^2$.

Example 3

The polymer particles obtained in Manufacturing Example 3 of the polymer particles were fed in the classification rotor type air flow classifier (trade name "Turbo Classifier (registered trademark) TC-25" manufactured by Nisshin Engineering Inc.), and subjected to classification by the classification rotor type air flow classifier using a coarse powder rotor as the classification rotor so that the value of (number-based CV value)/(volume-based CV value) was within the range of 1.0 to 3.5. Thus, 30 wt. % of coarse powder was removed from the polymer particles. Sequentially, the above treated polymer particles were subjected to classification by the classification rotor type air flow classifier using a fine powder rotor as the classification rotor so that the value of (number-based CV value)/(volume-based CV value) was within the range of 1.0 to 3.0. Thus, 25 wt. % of fine powder was removed from the polymer particles. In this way, the cross-linked polymethyl methacrylate particles, which are an example of the polymer particles of the present invention, were obtained.

The obtained cross-linked polymethyl methacrylate particles had the volume average particle diameter of 2.7 μm, the volume-based CV value of 18.1%, the number average particle diameter of 2.4 μm, the number-based CV value of 21.2%, the value of (number-based CV value)/(volume-based CV value) of 1.17, and the volume-based maximum particle diameter of 6.2 μm. Also, the obtained cross-linked polymethyl methacrylate particles had the refractive index of 1.495, the gel fraction of 97.9 wt. %, the non-volatile component concentration of 0.8 wt. %, and the surfactant content per unit surface area of the polymer particles of $180 \times 10^{-5}$ g/m$^2$. Furthermore, in the obtained cross-linked polymethyl methacrylate particles, the number of polymer particles having the particle diameter in the range from not less than 8 μm to not more than 10 μm was 1 in the counted 300,000 (three hundred thousand) particles, and there was no polymer particle having the particle diameter of more than 10 μm.

Example 4

The polymer particles obtained in Manufacturing Example 4 of the polymer particles were fed in the Coanda type air flow classifier (Elbow-Jet Air Classifier, type: EJ-PURO, manufactured by Nittetsu Mining Co., Ltd. and distributed by MATSUBO Corporation), and subjected to classification by the Coanda type air flow classifier so that the value of (number-based CV value)/(volume-based CV value) was within the range of 1.0 to 3.5. Thus, 35 wt. % of coarse powder and 30 wt. % of fine powder were removed from the polymer particles. In this way, the cross-linked polymethyl methacrylate particles, which are an example of the polymer particles of the present invention, were obtained.

The obtained cross-linked polymethyl methacrylate particles had the volume average particle diameter of 18.1 μm, the volume-based CV value of 26.2%, the number average particle diameter of 13.4 μm, the number-based CV value of 42.6%, the value of (number-based CV value)/(volume-based CV value) of 2.12, and the volume-based maximum particle diameter of 33.2 μm. Also, the obtained cross-linked polymethyl methacrylate particles had the refractive index of 1.495, the gel fraction of 97.8 wt. %, the non-volatile component concentration of 1.2 wt. %, and the surfactant content per unit surface area of the polymer particles of $64 \times 10^{-5}$ g/m$^2$.

Example 5

The polymer particles (cross-linked methyl methacrylate-styrene co-polymer particles) obtained in Manufacturing Example 5 of the polymer particles were fed in the classification rotor type air flow classifier (trade name "Turbo Classifier (registered trademark) TC-25" manufactured by Nisshin Engineering Inc.), and subjected to classification by the classification rotor type air flow classifier using a coarse powder rotor as the classification rotor so that the value of (number-based CV value)/(volume-based CV value) was within the range of 1.0 to 3.5. Thus, 25 wt. % of coarse powder (coarse polymer particles) was removed from the polymer particles. Sequentially, the above treated polymer particles were subjected to classification by the classification rotor type air flow classifier using a fine powder rotor as the classification rotor so that the value of (number-based CV value)/(volume-based CV value) was within the range of 1.0 to 3.0. Thus, 25 wt. % of fine powder (fine polymer particles) was removed from the polymer particles. In this way, the cross-linked methyl methacrylate-styrene co-polymer particles, which are an example of the polymer particles of the present invention, were obtained.

The obtained cross-linked methyl methacrylate-styrene co-polymer particles had the volume average particle diameter of 4.1 μm, the volume-based CV value of 23.7%, the number average particle diameter of 3.4 μm, the number-based CV value of 28.0%, the value of (number-based CV value)/(volume-based CV value) of 1.18, and the volume-based maximum particle diameter of 12.0 μm. Also, the obtained cross-linked methyl methacrylate-styrene co-polymer particles had the refractive index of 1.505, the gel fraction of 97.2 wt. %, the non-volatile component concentration of 1.0 wt. %, and the surfactant content per unit surface area of the polymer particles of $98 \times 10^{-5}$ g/m$^2$.

Example 6

The polymer particles (cross-linked polymethyl methacrylate particles) obtained in Manufacturing Example 6 of the polymer particles were fed in the Coanda type air flow classifier (Elbow-Jet Air Classifier, type: EJ-PURO, manufactured by Nittetsu Mining Co., Ltd. and distributed by MATSUBO Corporation), and subjected to classification by the Coanda type air flow classifier so that the value of (number-based CV value)/(volume-based CV value) was within the range of 1.0 to 3.5. Thus, 10 wt. % of coarse powder and 10 wt. % of fine powder were removed from the polymer particles. In this way, the cross-linked polymethyl methacrylate particles, which are an example of the polymer particles of the present invention, were obtained.

The obtained cross-linked polymethyl methacrylate particles had the volume average particle diameter of 8.0 μm, the volume-based CV value of 24.0%, the number average particle diameter of 6.2 μm, the number-based CV value of 35.0%, the value of (number-based CV value)/(volume-based CV value) of 1.46, and the volume-based maximum particle diameter of 19.0 μm. Also, the obtained cross-linked polymethyl methacrylate particles had the refractive index of 1.495, the gel fraction of 97.6 wt. %, the non-volatile component concentration of 2.1 wt. %, and the surfactant content per unit surface area of the polymer particles of $197 \times 10^{-5}$ g/m$^2$.

Example 7

The polymer particles (cross-linked polybutyl acrylate particles) obtained in Manufacturing Example 7 of the polymer particles were fed in the classification rotor type air flow classifier (trade name "Turbo Classifier (registered trademark) TC-25" manufactured by Nisshin Engineering Inc.), and subjected to classification by the classification rotor type air flow classifier using a coarse powder rotor as the classification rotor so that the value of (number-based CV value)/(volume-based CV value) was within the range of 1.0 to 3.5. Thus, 40 wt. % of coarse powder was removed from the polymer particles. Sequentially, the above treated polymer particles were subjected to classification by the classification rotor type air flow classifier using a fine powder rotor as the classification rotor so that the value of (number-based CV value)/(volume-based CV value) was within the range of 1.0 to 3.0. Thus, 25 wt. % of fine powder was removed from the polymer particles. In this way, the cross-linked polybutyl acrylate particles, which are an example of the polymer particles of the present invention, were obtained.

The obtained cross-linked polybutyl acrylate particles had the volume average particle diameter of 28.5 μm, the volume-based CV value of 24.5%, the number average particle diameter of 18.2 μm, the number-based CV value of 37.5%, the value of (number-based CV value)/(volume-based CV value) of 1.53, and the volume-based maximum particle diameter of 70.4 μm. Also, the obtained cross-linked polybutyl acrylate particles had the refractive index of 1.495, the gel fraction of 98.1 wt. %, the non-volatile component concentration of 0.4 wt. %, and the surfactant content per unit surface area of the polymer particles of $44 \times 10^{-5}$ g/m$^2$.

Comparative Example 1

The polymer particles (cross-linked polymethyl methacrylate particles) obtained in Manufacturing Example 1 of the polymer particles were fed in the classification rotor type air flow classifier (trade name "Turbo Classifier (registered trademark) TC-25" manufactured by Nisshin Engineering Inc.), and subjected to classification by the classification rotor type air flow classifier using a coarse powder rotor as the classification rotor so that the value of (number-based CV value)/(volume-based CV value) was within the range of 1.0 to 3.5. Thus, 10 wt. % of coarse powder was removed from the polymer particles. Sequentially, the above treated polymer particles were subjected to classification by the classification rotor type air flow classifier using a fine powder rotor as the classification rotor so that the value of (number-based CV value)/(volume-based CV value) was within the range of 1.0 to 3.0. Thus, 10 wt. % of fine powder was removed from the polymer particles. In this way, the cross-linked polymethyl methacrylate particles, which are a comparative example of the polymer particles, were obtained.

The obtained cross-linked polymethyl methacrylate particles had the volume average particle diameter of 13.9 μm, the volume-based CV value of 34.3%, the number average particle diameter of 7.5 μm, the number-based CV value of 55.5%, the value of (number-based CV value)/(volume-based CV value) of 1.62, and the volume-based maximum particle diameter of 30.2 μm. Also, the obtained cross-linked polymethyl methacrylate particles had the refractive index of 1.495, the gel fraction of 98.3 wt. %, the non-volatile component concentration of more than 3.5 wt. %, and the surfactant content per unit surface area of the polymer particles of $91 \times 10^{-5}$ g/m$^2$.

Comparative Example 2

The polymer particles (cross-linked polymethyl methacrylate particles) obtained in Manufacturing Example 2 of the polymer particles were fed in the Coanda type air flow classifier (Elbow-Jet Air Classifier, type: EJ-PURO, manufactured by Nittetsu Mining Co., Ltd. and distributed by MATSUBO Corporation), and subjected to classification by the Coanda type air flow classifier so that the value of (number-based CV value)/(volume-based CV value) was within the range of 1.0 to 3.5. Thus, 10 wt. % of coarse powder and 10 wt. % of fine powder were removed from the polymer particles. In this way, the cross-linked polymethyl methacrylate particles, which are a comparative example of the polymer particles, were obtained.

The obtained cross-linked polymethyl methacrylate particles had the volume average particle diameter of 5.9 μm, the volume-based CV value of 32.0%, the number average particle diameter of 3.9 μm, the number-based CV value of 43.1%, the value of (number-based CV value)/(volume-based CV value) of 1.35, and the volume-based maximum particle diameter of 15.3 μm. Also, the obtained cross-linked polymethyl methacrylate particles had the refractive index of 1.495, the gel fraction of 98.4 wt. %, the non-volatile component concentration of more than 3.5 wt. %, and the surfactant content per unit surface area of the polymer particles of $250 \times 10^{-5}$ g/m$^2$.

Comparative Example 3

The polymer particles (cross-linked polymethyl methacrylate particles) obtained in Manufacturing Example 3 of the polymer particles were fed in a blow-through type, high-performance sieving machine (trade name "Hi-Bolter" manufactured by Toyo Hitec Co., Ltd), and subjected to classification by the blow-through type, high-performance sieving machine. Thus, 5 wt. % of coarse powder, and the fine powder were removed from the polymer particles. The fine powder was recovered by a bag filter. In this way, the cross-linked polymethyl methacrylate particles, which are a comparative example of the polymer particles, were obtained.

The obtained cross-linked polymethyl methacrylate particles had the volume average particle diameter of 2.8 μm, the volume-based CV value of 26.2%, the number average particle diameter of 2.5 μm, the number-based CV value of 28.5%, the value of (number-based CV value)/(volume-based CV value) of 1.08, and the volume-based maximum particle diameter of 14.8 μm. Also, the obtained cross-linked polymethyl methacrylate particles had the refractive index of 1.495, the gel fraction of 97.5 wt. %, the non-volatile component concentration of 0.9 wt. %, and the surfactant content per unit surface area of the polymer particles of $183 \times 10^{-5}$ g/m$^2$.

For each of the above Examples and Comparative Examples, the following obtained values are collectively shown in Table 1: the volume-based average particle diameter (volume average particle diameter); the volume-based CV value; the number-based average particle diameter (number average particle diameter); the value of (number-based CV value)/(volume-based CV value); the volume-based maximum particle diameter; the refractive index; the gel fraction; the non-volatile component concentration; and the surfactant content per unit surface area of the polymer particles.

TABLE 1

| | Parameter | | | | | | | | | | |
|---|---|---|---|---|---|---|---|---|---|---|---|
| | Average Particle Diameter (μm) | CV Value (%) | Average Particle Diameter (μm) | CV Value (%) | (Number-Based CV Value)/ (Volume-Based CV Value) | Maximum Particle Diameter (μm) | (Maximum Particle Diameter)/ (Average Particle Diameter) | Refraction index | Gel Fraction (wt. %) | Non-Volatile Component Concentration (wt. %) | Surfactant Content per Unit Surface Area of Polymer Particles (g/m$^2$) |
| | | | | | Basis | | | | | | |
| | Volume | Volume | Number | Number | — | Volume | Volume | | | | |
| Example 1 | 13.5 | 15.7 | 12.0 | 24.3 | 1.55 | 24.0 | 1.78 | 1.495 | 98.1 | 0.5 | $67 \times 10^{-5}$ |
| Example 2 | 5.0 | 23.6 | 4.0 | 31.2 | 1.30 | 15.8 | 3.15 | 1.495 | 98.3 | 3.1 | $225 \times 10^{-5}$ |
| Example 3 | 2.7 | 18.1 | 2.4 | 21.2 | 1.17 | 6.2 | 2.30 | 1.495 | 97.9 | 0.8 | $180 \times 10^{-5}$ |
| Example 4 | 18.1 | 20.1 | 13.4 | 42.6 | 2.12 | 33.2 | 1.83 | 1.495 | 97.8 | 1.2 | $64 \times 10^{-5}$ |
| Example 5 | 4.1 | 23.7 | 3.4 | 28.0 | 1.18 | 12.0 | 2.93 | 1.505 | 97.2 | 1.0 | $98 \times 10^{-5}$ |
| Example 6 | 8.0 | 24.0 | 6.2 | 35.0 | 1.46 | 19.0 | 2.38 | 1.495 | 97.6 | 2.1 | $197 \times 10^{-5}$ |
| Example 7 | 28.5 | 24.5 | 18.2 | 37.5 | 1.53 | 70.4 | 2.47 | 1.495 | 98.1 | 0.4 | $44 \times 10^{-5}$ |
| Comparable Example 1 | 13.9 | 34.3 | 7.5 | 55.5 | 1.62 | 30.2 | 2.17 | 1.495 | 98.3 | More Than 3.5 | $91 \times 10^{-5}$ |
| Comparable Example 2 | 5.9 | 32.0 | 3.9 | 43.1 | 1.35 | 15.3 | 2.60 | 1.495 | 98.4 | More Than 3.5 | $250 \times 10^{-5}$ |

TABLE 1-continued

| | Parameter | | | | | | | | | |
|---|---|---|---|---|---|---|---|---|---|---|
| | Average Particle Diameter (μm) | CV Value (%) | Average Particle Diameter (μm) | CV Value (%) | (Number-Based CV Value)/ (Volume-Based CV Value) | Maximum Particle Diameter (μm) | (Maximum Particle Diameter)/ (Average Particle Diameter) | Refraction index | Gel Fraction (wt. %) | Non-Volatile Component Concentration (wt. %) | Surfactant Content per Unit Surface Area of Polymer Particles (g/m$^2$) |
| | Volume | Volume | Number | Number | — | Volume | Volume | | | | |
| Comparable Example 3 | 2.8 | 26.2 | 2.5 | 28.5 | 1.08 | 14.8 | 5.36 | 1.495 | 97.5 | 0.9 | 183 × 10$^{-5}$ |

Example 8: Manufacturing Example of Light Diffusion Film

The following were well mixed: 250 parts by weight of the polymer particles obtained in Example 1; 180 parts by weight of acrylic polyol (Acrydic A-801, with 50 wt. % of solid content) and 50 parts by weight of polyisocyanate (Takenate D110N, with 60 wt. % of solid content) as the binder resin; and 300 parts by mass of toluene and 330 parts by mass of methyl ethyl ketone as the organic solvent. The mixture was applied onto a PET film having the thickness of 100 μm as a film base material by die coating so as to form a coating film having the thickness of 20 μm. Thus, a light diffusion film was prepared. The prepared light diffusion film had a good quality without transmission defect, in which the polymer particles were evenly and entirely dispersed.

Example 9: Manufacturing Example of Light Diffusion Film

The light diffusion film was prepared in the same way as Example 8 except for using the polymer particles obtained in Example 2 in place of the polymer particles obtained in Example 1. The prepared light diffusion film had a good quality without transmission defect, in which the polymer particles were evenly and entirely dispersed.

Example 10: Manufacturing Example of Light Diffusion Film

The light diffusion film was prepared in the same way as Example 8 except for using the polymer particles obtained in Example 3 in place of the polymer particles obtained in Example 1. The prepared light diffusion film had a good quality without transmission defect, in which the polymer particles were evenly and entirely dispersed.

Example 11: Manufacturing Example of Light Diffusion Film

The light diffusion film was prepared in the same way as Example 8 except for using the polymer particles obtained in Example 4 in place of the polymer particles obtained in Example 1. The prepared light diffusion film had a good quality without transmission defect, in which the polymer particles were evenly and entirely dispersed.

Example 12: Manufacturing Example of Light Diffusion Film

The light diffusion film was prepared in the same way as Example 8 except for using the polymer particles obtained in Example 5 in place of the polymer particles obtained in Example 1. The prepared light diffusion film had a good quality without transmission defect, in which the polymer particles were evenly and entirely dispersed.

Example 13: Manufacturing Example of Light Diffusion Film

The light diffusion film was prepared in the same way as Example 8 except for using the polymer particles obtained in Example 6 in place of the polymer particles obtained in Example 1. The prepared light diffusion film had a good quality without transmission defect, in which the polymer particles were evenly and entirely dispersed.

Example 14: Manufacturing Example of Light Diffusion Film

The light diffusion film was prepared in the same way as Example 8 except for using the polymer particles obtained in Example 7 in place of the polymer particles obtained in Example 1. The prepared light diffusion film had a good quality without transmission defect, in which the polymer particles were evenly and entirely dispersed.

Comparative Example 4: Comparative Manufacturing Example of Light Diffusion Film The light diffusion film was prepared in the same way as Example 8 except for using the polymer particles obtained in Comparative Example 1 in place of the polymer particles obtained in Example 1. The prepared light diffusion film had a transmission defect, in which parts of the polymer particles were unevenly dispersed.

Comparative Example 5: Comparative Manufacturing Example of Light Diffusion Film The light diffusion film was prepared in the same way as Example 8 except for using the polymer particles obtained in Comparative Example 2 in place of the polymer particles obtained in Example 1. The prepared light diffusion film had a transmission defect, in which parts of the polymer particles were unevenly dispersed.

Comparative Example 6: Comparative Manufacturing Example of Light Diffusion Film The light diffusion film was prepared in the same way as Example 8 except for using the polymer particles obtained in Comparative Example 3 in place of the polymer particles obtained in Example 1. The prepared light diffusion film had a transmission defect, in which parts of the polymer particles were unevenly dispersed.

As described above, the light diffusion films in which were used the polymer particles in Comparative Examples 1 to 3 (each coefficient of variation in the volume-based particle diameter distribution exceeded 25.0%, specifically fell within the range of 26.2 to 34.3%) had a transmission defect. In contrast, the light diffusion films in which were used the polymer particles in Examples 1 to 7 (each coefficient of variation in the volume-based particle diameter distribution fell within the range from not less than 13.0% to not more than 25.0%, specifically within the range of 15.7 to 24.5%) had a good quality without transmission defect. Furthermore, the light diffusion films in which were used the polymer particles in Comparative Examples 1 and 2 (each concentration of the non-volatile components exceeded 3.5 wt. %) had a transmission defect. In contrast, the light diffusion films in which were used the polymer particles in Examples 1 to 7 (each concentration of the non-volatile components was less than 3.5 wt. %, specifically, fell within the range of 0.4 to 3.1 wt. %) had a good quality without transmission defect.

Example 15: Manufacturing Example of Body Lotion

The following were well mixed in a mixer: 3 parts by weight of the polymer particles obtained in Example 6; 50 parts by weight of ethanol as a dispersion medium; 0.1 part by weight of glycyrrhizic acid as an anti-inflammatory agent; 46.4 parts by weight of purified water as a dispersion medium; and 0.5 part by weight of perfume. Thus, a body lotion as an external preparation was obtained.

The obtained body lotion was excellent in slipperiness when it was applied onto the skin, and had a smooth and good feeling of use. Also, the body lotion had a good usability since the settled-out resin particles were easily re-dispersed when the lotion was only lightly shaken at the time of use.

Example 16: Manufacturing Example of Pre-Shave Lotion

The following were well mixed in a mixer: 4 parts by weight of the polymer particles obtained in Example 6; 91 parts by weight of ethanol as a dispersion solvent; 5.0 parts by weight of 1,3-butylene glycol as a dispersion medium; 2.0 parts by weight of ethylhexanoic acid cetyl; and perfume (appropriate amount). Thus, a pre-shave lotion as an external preparation was obtained.

The obtained pre-shave lotion was excellent in slipperiness when it was applied onto the skin, and had a smooth and good feeling of use. Also, the pre-shave lotion had a good usability since the settled-out resin particles were easily re-dispersed when the lotion was only lightly shaken at the time of use.

Example 17: Manufacturing Example of Powder Foundation

The following were mixed in the Henschel mixer: 15 parts by weight of the polymer particles obtained in Example 6; 21 parts by weight of sericite as clay minerals; 51 parts by weight of white mica as clay minerals; 0.6 part by weight of red iron oxide as a colorant pigment; 1 part by weight of yellow iron oxide as a colorant pigment; and 0.1 part by weight of black iron oxide as a colorant pigment. Thus, a mixture was obtained. Then, to the mixture was added a mixed melt constituting 10 parts by weight of 2-ethylhexanoic acid cetyl as a fatty acid ester, 1 part by weight of sorbitan sesquioleate as a surfactant, and 0.2 part by weight of preservative, which was further uniformly mixed. To the thus obtained mixture, 0.1 part by weight of perfume was further added and mixed, and then the mixture was pulverized. The pulverized product was sieved so that the pulverized product that passed through the sieve was subjected to compression molding on a metal tray. Thus, a powder foundation was obtained.

The obtained powder foundation was excellent in slipperiness when it was applied onto the skin, and had a smooth and good feeling of use.

Example 18: Manufacturing Example of Emulsion Type Foundation

The following were mixed in a kneader: 20.0 parts by weight of the polymer particles obtained in Example 6; 6.0 parts by weight of sericite as clay minerals; 3.0 parts by weight of titanium dioxide; and pigments (appropriate amount). Thus, a powder component was obtained.

Apart from the powder component, the following were added to 50.2 parts by weight of purified water as a dispersion medium so as to be subjected to thermal dissolution: 5.0 parts by weight of polyethylene glycol (polyethylene glycol 4000) as a moisturizer; 1.0 part by weight of triethanol amine as a pH adjuster; 5.0 parts by weight of propylene glycol as a moisturizer; and 0.5 part by weight of aluminum magnesium silicate (trade name "VEEGUM (registered trade mark)" manufactured by Vanderbilt Co., Inc) as clay minerals. The previously prepared powder component was added to the thus obtained solution so that the powder component was homogeneously dispersed using the homomixer. After that, the solution was maintained at 70° C., thus an aqueous phase component was obtained.

Then, apart from the above aqueous phase component, the following were mixed and subjected to thermal dissolution: 2.0 parts by weight of stearic acid as higher fatty acid; 0.3 part by weight of cetyl alcohol as higher alcohol; 20.0 parts by weight of liquid paraffin as hydrocarbon; perfume (appropriate amount); and preservative (appropriate amount). After that, the oil solution was maintained at 70° C., thus an oil phase component was obtained.

The previously prepared aqueous phase component was added to the obtained oil phase component so as to be subjected to pre-emulsification. Then, the mixture was homogeneously emulsified and dispersed using the homomixer, and after that, the mixture was cooled while being stirred. Thus, an emulsion type foundation was obtained.

The obtained emulsion type foundation was excellent in slipperiness when it was applied onto the skin, and had a smooth and good feeling of use.

Example 19: Manufacturing Example of Loose Powder

The following were mixed in the Henschel mixer: 21.0 parts by weight of the polymer particles obtained in Example 6; 30.0 parts by weight of mica as clay minerals; 30.0 parts by weight of sericite as clay minerals; 9.0 parts by weight of titanium sericite as clay minerals; 8.0 parts by weight of titanium dioxide; and 2.0 parts by weight of iron oxide as a colorant pigment. Then, the mixture was subjected once to pulverization by a rotor speed mill ZM-100

(manufactured by Retsch GmbH) using a 12-tooth rotor, an attached sieve with holes of 1 mm, and having a rotational speed of 14000 rpm. Thus, loose powder was obtained.

The obtained loose powder was excellent in slipperiness when it was applied onto the skin, and had a smooth and good feeling of use.

Example 20: Manufacturing Example of Body Powder

The following were mixed in the Henschel mixer: 50.0 parts by weight of the polymer particles obtained in Example 6; 25.0 parts by weight of mica as clay minerals; and 25.0 parts by weight of sericite as clay minerals. Then, the mixture was subjected once to pulverization by the rotor speed mill ZM-100 (manufactured by Retsch GmbH) using a 12-tooth rotor, an attached sieve with holes of 1 mm, and having a rotational speed of 14000 rpm. Thus, body powder was obtained.

The obtained body powder was excellent in slipperiness when it was applied onto the skin, and had a good feeling of use.

Example 21: Manufacturing Example of Resin Composition for Coating

The following were stirred by a centrifugal stirrer for 3 minutes: 3 parts by weight of the polymer particles obtained in Example 6; and 20 parts by weight of commercially-available aqueous resin binder solution (urethane resin, trade name "U330" manufactured by Alberdingk Boley GmbH, having the solid content of 30 wt. %). Thus, a dispersion liquid was obtained. In this process, the polymer particles were easily dispersed in the aqueous resin binder by being stirred for 3 minutes using the centrifugal stirrer.

Then, the obtained dispersion liquid was left for 3 hours, and after that, it was re-stirred for 3 minutes by the centrifugal stirrer. Thus, a resin composition for coating (i.e. coating material) was obtained.

The obtained resin composition for coating was excellent in re-dispersibility, in which the polymer particles were re-dispersed by only being shaken even after 12 hours passed.

(Application to Acrylic Plate)

A matte coating film having the thickness of 50 μm was prepared by spraying the resin composition for coating onto an acrylic plate having a thickness of 3 mm. The obtained coating film did not have any roughness (protrusions), and had an excellent texture and a matte property.

The present invention may be embodied in other forms without departing from the gist or essential characteristics thereof. The foregoing examples are therefore to be considered in all respects as illustrative and not limiting. The scope of the present invention is indicated by the appended claims rather than by the foregoing description, and all modifications and changes that come within the meaning and range of equivalency of the claims are intended to be embraced therein.

Also, this application claims priority on Patent Application No. 2015-194341 filed in Japan on Sep. 30, 2015. The entire contents thereof are hereby incorporated in this application by reference.

The invention claimed is:

1. Polymer particles comprising:
at least one polymer selected from the group consisting of a (meth)acrylic cross-linked polymer, a styrene cross-linked polymer, and a (meth)acrylic-styrene cross-linked co-polymer, and
a surfactant,
wherein a coefficient of variation in a volume-based particle diameter distribution is in a range from not less than 13.0% to not more than 25.0%,
wherein, when 15.0 g of water is added to 5.0 g of the polymer particles so as to disperse the polymer particles in the water by performing a dispersion treatment for 60 minutes using an ultrasonic cleaner, and furthermore when an obtained dispersion liquid is put into a centrifuge tube with an inside diameter of 24 mm so as to be centrifuged, by a centrifugal separator, under conditions that K factor is 6943 and a rotating time is 30 minutes to recover a supernatant, a concentration of non-volatile components in the obtained supernatant is less than 3.5 wt. %,
wherein a surfactant content per unit surface area of the polymer particles is $10\times10^{-5}$ g/m$^2$ to $250\times10^{-5}$ g/m$^2$, and
wherein a volume average particle diameter is in a range from more than 8 μm to not more than 30 μm.

2. The polymer particles according to claim 1, wherein the coefficient of variation in the volume-based particle diameter distribution is in a range from more than 15.0% to not more than 25.0%.

3. The polymer particles according to claim 1, wherein a gel fraction is not less than 90 wt. %.

4. The polymer particles according to claim 1, wherein a refractive index is in a range of 1.490 to 1.595.

5. The polymer particles according to claim 1, wherein a maximum particle diameter in the volume-based particle diameter distribution is not more than 3.5 times the volume average particle diameter.

6. The polymer particles according to claim 1, wherein a number of the polymer particles having a particle diameter in a range from not less than 8 μm to not more than 10 μm is not more than 2 in 300,000 polymer particles.

7. The polymer particles according to claim 1, wherein a maximum particle diameter in the volume-based particle diameter distribution is not more than 2.5 times the volume average particle diameter.

8. The polymer particles according to claim 1, wherein a value obtained by dividing a coefficient of variation in a number-based particle diameter distribution by the coefficient of variation in the volume-based particle diameter distribution is in a range of 1.0 to 3.0.

9. The polymer particles according to claim 1, wherein the polymer particles are an additive to a coating agent or an additive to ink.

10. The polymer particles according to claim 1, wherein the polymer particles are an additive to an external preparation.

11. The polymer particles according to claim 1, wherein the polymer particles are a light diffusing agent for an optical member.

12. The polymer particles according to claim 1, wherein the polymer particles are a surface roughening agent for a resin film.

13. Polymer particles comprising:
at least one polymer selected from the group consisting of a (meth)acrylic cross-linked polymer, a styrene cross-linked polymer, and a (meth)acrylic-styrene cross-linked co-polymer, and
a surfactant, wherein a coefficient of variation in a volume-based particle diameter distribution is in a range from not less than 13.0% to not more than 25.0%, wherein, when 15.0 g of water is added to 5.0 g of the polymer particles so as to disperse the polymer particles in the water by performing a dispersion treatment for 60 minutes using an ultrasonic cleaner, and furthermore when an obtained dispersion liquid is put into a centrifuge tube with an inside diameter of 24 mm so as to be centrifuged, by a centrifugal separator, under conditions that K factor is 6943 and a rotating time is 30 minutes to recover a supernatant, a concentration of non-volatile components in the obtained supernatant is less than 3.5 wt. %, wherein a surfactant content per unit surface area of the polymer particles is $10 \times 10^{-5}$ g/m$^2$ to $250 \times 10^{-5}$ g/m$^2$, wherein the polymer particles are an additive to a coating agent, to ink, or to an external preparation, and wherein a volume average particle diameter is in a range of 4 to 30 µm.

14. A resin composition comprising the polymer particles according to claim 1.

15. The resin composition according to claim 14, wherein the resin composition is a resin composition for coating.

16. An optical film comprising: a base film; and a coating formed on the base film,
wherein the coating contains the polymer particles according to claim 1.

17. An external preparation comprising the polymer particles according to claim 1.

* * * * *